US012732880B2

(12) United States Patent
Cheng et al.

(10) Patent No.: US 12,732,880 B2
(45) Date of Patent: Sep. 8, 2026

(54) MEASUREMENT REPORTING AND HANDOVER PROCEDURES BETWEEN RELAY PATHS

(71) Applicant: QUALCOMM Incorporated, San Diego, CA (US)

(72) Inventors: Peng Cheng, Beijing (CN); Karthika Paladugu, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 514 days.

(21) Appl. No.: 18/253,587

(22) PCT Filed: Jan. 13, 2021

(86) PCT No.: PCT/CN2021/071378
§ 371 (c)(1),
(2) Date: May 18, 2023

(87) PCT Pub. No.: WO2022/151003
PCT Pub. Date: Jul. 21, 2022

(65) Prior Publication Data
US 2024/0007922 A1 Jan. 4, 2024

(51) Int. Cl.
*H04W 36/30* (2009.01)
*H04W 40/12* (2009.01)
(Continued)

(52) U.S. Cl.
CPC ........... *H04W 36/30* (2013.01); *H04W 40/12* (2013.01); *H04W 40/22* (2013.01); *H04W 40/36* (2013.01)

(58) Field of Classification Search
None
See application file for complete search history.

(56) References Cited

U.S. PATENT DOCUMENTS

2014/0073314 A1* 3/2014 Pradas .............. H04W 36/0088 455/422.1
2016/0212682 A1* 7/2016 Chung .................. H04W 76/14
(Continued)

FOREIGN PATENT DOCUMENTS

CN 110611901 A 12/2019
WO WO-2017014716 A1 1/2017
(Continued)

OTHER PUBLICATIONS

Supplementary European Search Report—EP21918220—Search Authority—MUNICH—Sep. 17, 2024.
(Continued)

*Primary Examiner* — Brian S Roberts
(74) *Attorney, Agent, or Firm* — QUALCOMM Incorporated

(57) ABSTRACT

Methods, systems, and devices for wireless communications are described. In some systems, a remote user equipment (UE) may communicate with a base station via a relay UE. For example, the relay UE may operate as a layer 2 (L2) UE-to-network relay supporting a PC5-to-Uu bearer mapping, such that the relay UE forwards messages between the PC5 bearer for the remote UE and the Uu bearer for the base station. If the remote UE determines a trigger event, the remote UE may transmit a measurement report to the base station (e.g., via the relay UE) indicating candidate relays. Based on the measurement report, the base station may determine to handover the UE from using a first relay UE to using a second relay UE. The base station may transmit a handover command to the UE, triggering the remote UE to communicate with the base station via the second relay UE.

30 Claims, 16 Drawing Sheets

(51) Int. Cl.
*H04W 40/22* (2009.01)
*H04W 40/36* (2009.01)

(56) References Cited

U.S. PATENT DOCUMENTS

| | | | | |
|---|---|---|---|---|
| 2016/0337954 | A1* | 11/2016 | Gulati | H04W 48/17 |
| 2017/0237817 | A1* | 8/2017 | Sharma | H04W 48/10 370/331 |
| 2018/0084442 | A1* | 3/2018 | Lee | H04W 76/27 |
| 2018/0092017 | A1* | 3/2018 | Freda | H04W 76/14 |
| 2018/0109990 | A1 | 4/2018 | Martin et al. | |
| 2018/0139682 | A1 | 5/2018 | Xu et al. | |
| 2018/0176811 | A1* | 6/2018 | Delsol | H04W 24/10 |
| 2018/0242381 | A1 | 8/2018 | Wei et al. | |
| 2019/0098686 | A1* | 3/2019 | Martin | H04W 76/23 |
| 2020/0178330 | A1* | 6/2020 | Wu | H04W 72/20 |
| 2020/0288511 | A1 | 9/2020 | Burbidge et al. | |
| 2021/0144781 | A1* | 5/2021 | Xu | H04W 76/10 |
| 2023/0073469 | A1* | 3/2023 | Wang | H04W 72/1263 |
| 2023/0300713 | A1* | 9/2023 | Hoang | H04L 67/51 370/254 |
| 2024/0064593 | A1* | 2/2024 | Wu | H04W 36/362 |

FOREIGN PATENT DOCUMENTS

| | | | |
|---|---|---|---|
| WO | WO-2017030572 | A1 | 2/2017 |
| WO | WO-2018059126 | A1 | 4/2018 |
| WO | WO-2020259811 | A1 | 12/2020 |
| WO | WO-2022047745 | A1 | 3/2022 |

OTHER PUBLICATIONS

International Search Report and Written Opinion—PCT/CN2021/071378—ISA/EPO—Oct. 14, 2021.

Huawei, et al., “Service Continuity for L2 UE-to-Network Relay”, 3GPP TSG-RAN WG2 Meeting #111 Electronic, R2-2008048, Aug. 17, 2020-Aug. 28, 2020, Aug. 7, 2020, pp. 1-6.

ZTE : “Relay Selection and Reselection”, 3GPP TSG RAN WG2 #90, R2-152547, Fukuoka, Japan, May 25, 2015-May 29, 2015, May 16, 2015, 4 Pages.

* cited by examiner

300

MEASUREMENT REPORTING AND HANDOVER PROCEDURES BETWEEN RELAY PATHS

CROSS REFERENCE

The present application is a 371 national stage filing of International PCT Application No. PCT/CN2021/071378 by Cheng et al. entitled "MEASUREMENT REPORTING AND HANDOVER PROCEDURES BETWEEN RELAY PATHS," filed Jan. 13, 2021, which is assigned to the assignee hereof, and which is expressly incorporated by reference in its entirety herein.

FIELD OF TECHNOLOGY

The following relates to wireless communications, including measurement reporting and handover procedures between relay paths.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may be outside the coverage area of a base station or may otherwise experience a poor channel quality (e.g., below a channel quality threshold) associated with direct communications with the base station. In such cases, the UE may communicate with the base station via a relay UE. However, the quality of the connection (e.g., a PC5 connection) between the UE and the relay UE may similarly degrade, resulting in poor throughput, unreliable communications, or both between the UE and the base station using the relay UE.

SUMMARY

The described techniques relate to improved methods, systems, devices, and apparatuses that support measurement reporting and handover procedures between relay paths. Generally, the described techniques provide for an efficient mechanism to switch a user equipment (UE) from using a first relay UE to using a second relay UE based on a trigger event and measurement report. For example, in some wireless communications systems, a UE (e.g., a remote UE) may communicate with a base station via a relay UE. The relay UE may operate as a layer 2 (L2) UE-to-network relay supporting a PC5-to-Uu bearer mapping, such that the relay UE forwards messages between the PC5 bearer for the remote UE and the Uu bearer for the base station. In some examples, the remote UE may determine a trigger event, such as a sidelink channel metric for the connection between the remote UE and the relay UE failing to satisfy a first threshold, a sidelink channel metric for the remote UE and a candidate relay UE satisfying a second threshold, the difference between a first sidelink channel metric for the remote UE and a candidate relay UE and a second sidelink channel metric for the remote UE and the current relay UE satisfying an offset threshold, or any combination thereof. Based on the trigger event, the remote UE may transmit a measurement report to the base station (e.g., via the relay UE) indicating information related to the relay UE, one or more candidate relay UEs, a direct connection to the base station, or some combination thereof. The base station may receive the measurement report and determine to handover the UE between relay connections based on the measurement report. The base station may transmit a handover command to the UE, triggering the UE to perform a handover procedure to switch from using a first UE as a UE-to-network relay to using a second UE as the UE-to-network relay. The handover between relay UEs may support an improved connection between the UE (e.g., the remote UE) and the base station, increasing channel throughput, improving communication reliability, or both.

A method for wireless communications at a first UE is described. The method may include communicating with a network via a second UE operating as a UE-to-network relay, determining a trigger event for a measurement report associated with the second UE and at least a third UE corresponding to a candidate UE-to-network relay, transmitting the measurement report based on the trigger event, performing a handover procedure from the second UE operating as the UE-to-network relay to the third UE operating as the UE-to-network relay, and communicating with the network via the third UE operating as the UE-to-network relay based on the handover procedure.

An apparatus for wireless communications at a first UE is described. The apparatus may include a processor, memory coupled with the processor, and instructions stored in the memory. The instructions may be executable by the processor to cause the apparatus to communicate with a network via a second UE operating as a UE-to-network relay, determine a trigger event for a measurement report associated with the second UE and at least a third UE corresponding to a candidate UE-to-network relay, transmit the measurement report based on the trigger event, perform a handover procedure from the second UE operating as the UE-to-network relay to the third UE operating as the UE-to-network relay, and communicate with the network via the third UE operating as the UE-to-network relay based on the handover procedure.

Another apparatus for wireless communications at a first UE is described. The apparatus may include means for communicating with a network via a second UE operating as a UE-to-network relay, means for determining a trigger event for a measurement report associated with the second UE and at least a third UE corresponding to a candidate UE-to-network relay, means for transmitting the measurement report based on the trigger event, means for performing a handover procedure from the second UE operating as the UE-to-network relay to the third UE operating as the UE-to-network relay, and means for communicating with the network via the third UE operating as the UE-to-network relay based on the handover procedure.

A non-transitory computer-readable medium storing code for wireless communications at a first UE is described. The code may include instructions executable by a processor to communicate with a network via a second UE operating as a UE-to-network relay, determine a trigger event for a measurement report associated with the second UE and at least a third UE corresponding to a candidate UE-to-network relay, transmit the measurement report based on the trigger event, perform a handover procedure from the second UE operating as the UE-to-network relay to the third UE operating as the UE-to-network relay, and communicate with the network via the third UE operating as the UE-to-network relay based on the handover procedure.

Some examples of the method, apparatuses, and non-transitory computer-readable medium described herein may further include operations, features, means, or instructions for receiving, from the network, a configuration message indicating one or more threshold values, where the trigger event for the measurement report may be determined based on the one or more threshold values.

In some examples of the method, apparatuses, and non-transitory computer-readable medium described herein, the configuration message includes a radio resource control (RRC) message.

In some examples of the method, apparatuses, and non-transitory computer-readable medium described herein, determining the trigger event for the measurement report may include operations, features, means, or instructions for determining that a first sidelink channel metric between the first UE and the second UE fails to satisfy a first threshold value and determining that a second sidelink channel metric between the first UE and the third UE satisfies a second threshold value.

In some examples of the method, apparatuses, and non-transitory computer-readable medium described herein, determining the trigger event for the measurement report may include operations, features, means, or instructions for determining that a difference between a first sidelink channel metric between the first UE and the second UE and a second sidelink channel metric between the first UE and the third UE satisfies a threshold offset value.

In some examples of the method, apparatuses, and non-transitory computer-readable medium described herein, determining the trigger event for the measurement report may include operations, features, means, or instructions for determining that a first channel metric between the first UE and the second UE fails to satisfy a first threshold value and determining that a second channel metric between the first UE and a base station satisfies a second threshold value.

Some examples of the method, apparatuses, and non-transitory computer-readable medium described herein may further include operations, features, means, or instructions for receiving a set of multiple discovery messages from a set of multiple UEs and determining a set of UEs corresponding to candidate UE-to-network relays based on the set of multiple discovery messages, the set of UEs including at least the third UE.

Some examples of the method, apparatuses, and non-transitory computer-readable medium described herein may further include operations, features, means, or instructions for receiving, from the network, a configuration message indicating a criterion for the candidate UE-to-network relays for the trigger event, where determining the set of UEs corresponding to the candidate UE-to-network relays may be based on the configuration message.

In some examples of the method, apparatuses, and non-transitory computer-readable medium described herein, the criterion indicates that each candidate UE-to-network relay of the candidate UE-to-network relays corresponds to a same serving base station as the first UE, each candidate UE-to-network relay of the candidate UE-to-network relays corresponds to a same public land mobile network (PLMN) identifier (ID) as the first UE, or both.

In some examples of the method, apparatuses, and non-transitory computer-readable medium described herein, the configuration message includes an RRC message.

In some examples of the method, apparatuses, and non-transitory computer-readable medium described herein, the measurement report includes a first sidelink channel metric corresponding to the second UE, a second sidelink channel metric corresponding to the third UE, a first relay ID for the second UE, a second relay ID for the third UE, first load information for the second UE, second load information for the third UE, first power information for the second UE, second power information for the third UE, a first RRC state for the second UE, a second RRC state for the third UE, a first serving cell ID for the second UE, a second serving cell ID for the third UE, a first PLMN ID associated with the second UE, a second PLMN ID associated with the third UE, a channel metric corresponding to a base station, a cell ID for the base station, or a combination thereof.

In some examples of the method, apparatuses, and non-transitory computer-readable medium described herein, performing the handover procedure may include operations, features, means, or instructions for receiving, from the network via the second UE, a handover command indicating a PC5 radio link control (RLC) channel configuration for the third UE and reconfiguring an existing PC5 connection with the third UE based on the PC5 RLC channel configuration, where the third UE operates as the UE-to-network relay for the first UE based on the reconfiguring.

In some examples of the method, apparatuses, and non-transitory computer-readable medium described herein, performing the handover procedure may include operations, features, means, or instructions for receiving, from the network via the second UE, a handover command indicating a PC5 RLC channel configuration for the third UE and establishing a PC5 connection with the third UE based on the PC5 RLC channel configuration, where the third UE operates as the UE-to-network relay for the first UE based on the establishing.

In some examples of the method, apparatuses, and non-transitory computer-readable medium described herein, performing the handover procedure may include operations, features, means, or instructions for transmitting, to the second UE, a message indicating a PC5 RLC channel reconfiguration for the second UE and reconfiguring an existing PC5 connection with the second UE based on the PC5 RLC channel reconfiguration, where the second UE stops operating as the UE-to-network relay for the first UE based on the reconfiguring.

In some examples of the method, apparatuses, and non-transitory computer-readable medium described herein, performing the handover procedure may include operations, features, means, or instructions for transmitting, to the second UE, a message indicating a PC5 RLC channel release for the second UE and releasing an existing PC5 connection with the second UE based on the PC5 RLC channel release, where the second UE stops operating as the UE-to-network relay for the first UE based on the releasing.

In some examples of the method, apparatuses, and non-transitory computer-readable medium described herein, the UE-to-network relay includes an L2 UE-to-network relay supporting a PC5-to-Uu bearer mapping.

In some examples of the method, apparatuses, and non-transitory computer-readable medium described herein, the second UE relays first messages between the first UE and a first base station associated with a first PLMN ID and the third UE relays second messages between the first UE and the first base station, the first UE and a second base station associated with the first PLMN ID, or the first UE and a third base station associated with a second PLMN ID.

In some examples of the method, apparatuses, and non-transitory computer-readable medium described herein, communicating with the network via the second UE operating as the UE-to-network relay may include operations, features, means, or instructions for transmitting a first uplink message to the second UE via a first PC5 interface and receiving a first downlink message from the second UE via the first PC5 interface. In some examples of the method, apparatuses, and non-transitory computer-readable medium described herein, communicating with the network via the third UE operating as the UE-to-network relay may include operations, features, means, or instructions for transmitting a second uplink message to the third UE via a second PC5 interface and receiving a second downlink message from the third UE via the second PC5 interface.

A method for wireless communications at a base station is described. The method may include communicating with a first UE via a second UE operating as a UE-to-network relay, receiving, from the first UE via the second UE, a measurement report associated with the second UE and at least a third UE corresponding to a candidate UE-to-network relay, determining to handover the first UE from using the second UE as the UE-to-network relay to using the third UE as the UE-to-network relay based on the measurement report, transmitting a handover command to the first UE via the second UE based on determining to handover the first UE, and communicating with the first UE via the third UE operating as the UE-to-network relay based on the handover command.

An apparatus for wireless communications at a base station is described. The apparatus may include a processor, memory coupled with the processor, and instructions stored in the memory. The instructions may be executable by the processor to cause the apparatus to communicate with a first UE via a second UE operating as a UE-to-network relay, receive, from the first UE via the second UE, a measurement report associated with the second UE and at least a third UE corresponding to a candidate UE-to-network relay, determine to handover the first UE from using the second UE as the UE-to-network relay to using the third UE as the UE-to-network relay based on the measurement report, transmit a handover command to the first UE via the second UE based on determining to handover the first UE, and communicate with the first UE via the third UE operating as the UE-to-network relay based on the handover command.

Another apparatus for wireless communications at a base station is described. The apparatus may include means for communicating with a first UE via a second UE operating as a UE-to-network relay, means for receiving, from the first UE via the second UE, a measurement report associated with the second UE and at least a third UE corresponding to a candidate UE-to-network relay, means for determining to handover the first UE from using the second UE as the UE-to-network relay to using the third UE as the UE-to-network relay based on the measurement report, means for transmitting a handover command to the first UE via the second UE based on determining to handover the first UE, and means for communicating with the first UE via the third UE operating as the UE-to-network relay based on the handover command.

A non-transitory computer-readable medium storing code for wireless communications at a base station is described. The code may include instructions executable by a processor to communicate with a first UE via a second UE operating as a UE-to-network relay, receive, from the first UE via the second UE, a measurement report associated with the second UE and at least a third UE corresponding to a candidate UE-to-network relay, determine to handover the first UE from using the second UE as the UE-to-network relay to using the third UE as the UE-to-network relay based on the measurement report, transmit a handover command to the first UE via the second UE based on determining to handover the first UE, and communicate with the first UE via the third UE operating as the UE-to-network relay based on the handover command.

Some examples of the method, apparatuses, and non-transitory computer-readable medium described herein may further include operations, features, means, or instructions for transmitting, to the first UE, a configuration message indicating one or more threshold values, where the measurement report may be received based on a trigger event at the first UE triggering transmission of the measurement report based on the one or more threshold values.

In some examples of the method, apparatuses, and non-transitory computer-readable medium described herein, the configuration message includes an RRC message.

Some examples of the method, apparatuses, and non-transitory computer-readable medium described herein may further include operations, features, means, or instructions for transmitting, to the first UE, a configuration message indicating a criterion for a set of candidate UE-to-network relays for the first UE, where the measurement report includes information for the set of candidate UE-to-network relays based on the criterion.

In some examples of the method, apparatuses, and non-transitory computer-readable medium described herein, the criterion indicates that each candidate UE-to-network relay of the set of candidate UE-to-network relays corresponds to the base station serving the first UE, each candidate UE-to-network relay of the set of candidate UE-to-network relays corresponds to a same PLMN ID as the first UE, or both.

In some examples of the method, apparatuses, and non-transitory computer-readable medium described herein, the configuration message includes an RRC message.

In some examples of the method, apparatuses, and non-transitory computer-readable medium described herein, the measurement report includes a first sidelink channel metric corresponding to the second UE, a second sidelink channel metric corresponding to the third UE, a first relay ID for the second UE, a second relay ID for the third UE, first load information for the second UE, second load information for the third UE, first power information for the second UE, second power information for the third UE, a first RRC state for the second UE, a second RRC state for the third UE, a first serving cell ID for the second UE, a second serving cell ID for the third UE, a first PLMN ID associated with the second UE, a second PLMN ID associated with the third UE, a channel metric corresponding to a second base station, a cell ID for the second base station, or a combination thereof.

Some examples of the method, apparatuses, and non-transitory computer-readable medium described herein may further include operations, features, means, or instructions for transmitting, to the third UE, an RRC reconfiguration message indicating a PC5-to-Uu bearer mapping, where the third UE operates as the UE-to-network relay for the first UE based on the PC5-to-Uu bearer mapping.

Some examples of the method, apparatuses, and non-transitory computer-readable medium described herein may further include operations, features, means, or instructions for transmitting, to the second UE, an RRC reconfiguration message including an indication to release a PC5-to-Uu bearer mapping, where the second UE stops operating as the UE-to-network relay for the first UE based on the indication to release the PC5-to-Uu bearer mapping.

In some examples of the method, apparatuses, and non-transitory computer-readable medium described herein, the handover command indicates a PC5 RLC channel configuration for the first UE and the third UE, and the third UE operates as the UE-to-network relay for the first UE based on the PC5 RLC channel configuration.

In some examples of the method, apparatuses, and non-transitory computer-readable medium described herein, the UE-to-network relay includes an L2 UE-to-network relay supporting a PC5-to-Uu bearer mapping.

In some examples of the method, apparatuses, and non-transitory computer-readable medium described herein, communicating with the first UE via the second UE operating as the UE-to-network relay may include operations, features, means, or instructions for receiving a first uplink message from the second UE via a first Uu interface and transmitting a first downlink message to the second UE via the first Uu interface. In some examples of the method, apparatuses, and non-transitory computer-readable medium described herein, communicating with the first UE via the third UE operating as the UE-to-network relay may include operations, features, means, or instructions for receiving a second uplink message from the third UE via a second Uu interface and transmitting a second downlink message to the third UE via the second Uu interface.

DETAILED DESCRIPTION

Figure 1:
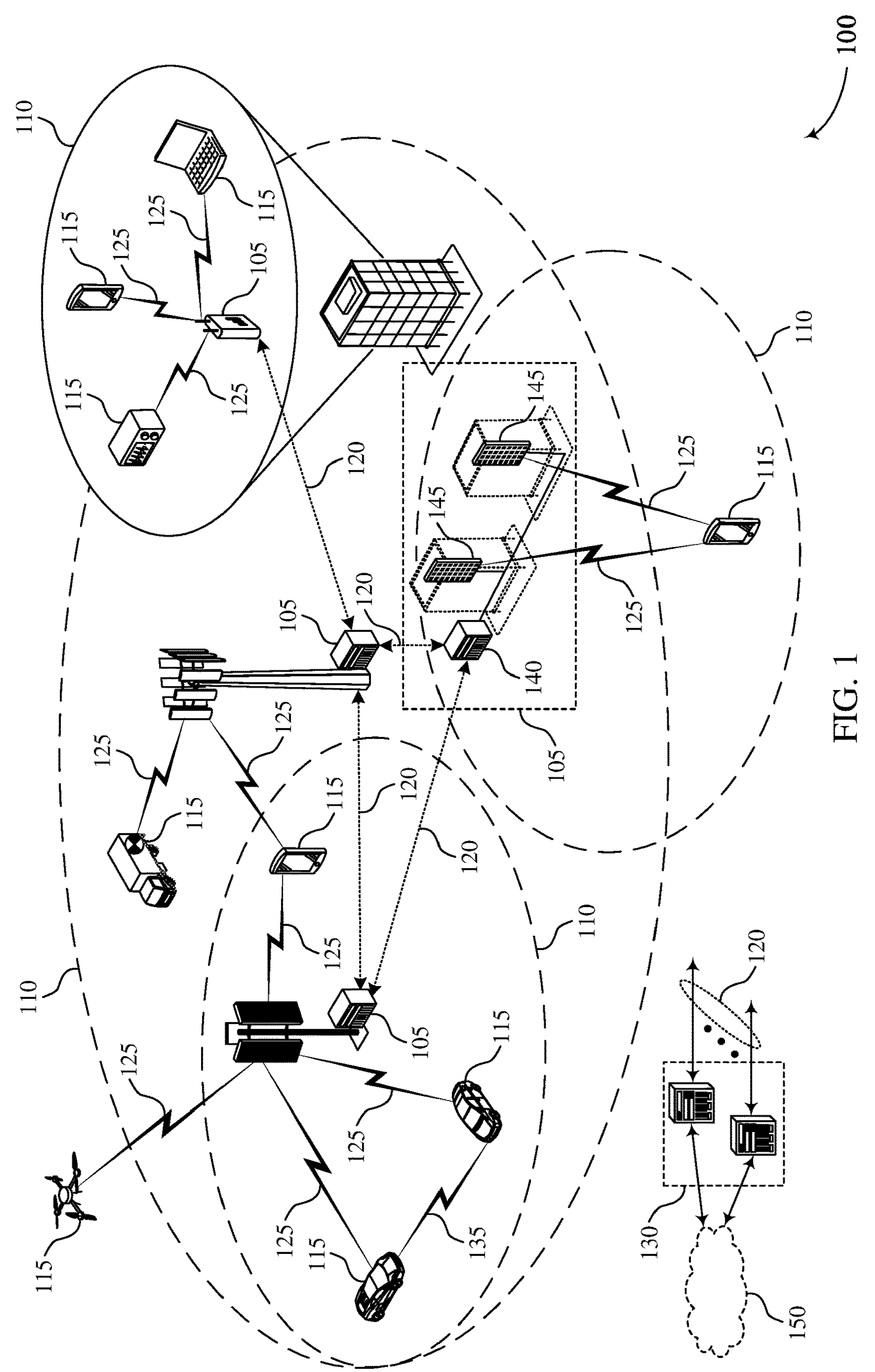
FIGS. 1 and 2 illustrate examples of wireless communications systems that support measurement reporting and handover procedures between relay paths in accordance with aspects of the present disclosure.

In some wireless communications systems, a user equipment (UE) may be outside the coverage area of a base station or may otherwise experience a poor channel quality (e.g., below a channel quality threshold) associated with direct communications with the base station. For example, a channel metric for a Uu connection between the UE and the base station may fail to satisfy a threshold. In some such cases, the UE may communicate with the base station via a relay UE, such as a layer 2 (L2) relay UE. An L2 relay may support a PC5-to-Uu bearer mapping for forwarding messages between the UE and the base station, for example, below a packet data convergence protocol (PDCP) layer. However, the quality of the connection (e.g., a PC5 connection) between the UE and the L2 relay UE may similarly degrade, resulting in poor throughput, unreliable communications, or both between the UE and the base station using the L2 relay UE.

In some examples, a wireless communications system may support one or more mechanisms for PC5-to-PC5 handover. For example, a UE (e.g., a remote UE using an L2 relay UE for communications with a base station) may determine whether one or more trigger events occur to trigger measurement reporting. To support PC5-to-PC5 handover, the UE may determine a trigger event based on a current relay UE and one or more candidate relay UEs. In some examples, the trigger event may involve a sidelink channel metric for the connection between the remote UE and the relay UE failing to satisfy a first threshold, a sidelink channel metric for the remote UE and a candidate relay UE satisfying a second threshold, the difference between a first sidelink channel metric for the remote UE and a candidate relay UE and a second sidelink channel metric for the remote UE and the current relay UE satisfying an offset threshold, or any combination thereof.

Based on the trigger event, the remote UE may transmit a measurement report to the base station (e.g., via the relay UE) indicating information related to the relay UE, one or more candidate relay UEs, a direct connection to a base station, or some combination thereof. The base station may receive the measurement report and may determine to handover the UE to a different PC5 path (e.g., a different L2 relay UE) based on the measurement report. The base station may transmit a handover command to the UE, triggering the UE to perform a handover procedure to switch from a first relay path using the current relay UE to a second relay path using a candidate relay UE. The handover between relay UEs may support an improved connection between the UE (e.g., the remote UE) and the base station (e.g., based on one or more improved channel metrics), increasing channel throughput, improving communication reliability, or both.

Aspects of the disclosure are initially described in the context of wireless communications systems and process flows. Aspects of the disclosure are further illustrated by and described with reference to apparatus diagrams, system diagrams, and flowcharts that relate to measurement reporting and handover procedures between relay paths.

FIG. 1 illustrates an example of a wireless communications system 100 that supports measurement reporting and handover procedures between relay paths in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots.

Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems 100, a UE 115 may communicate with a network via a relay UE 115. For example, the UE 115 may be a remote UE (e.g., outside the coverage area 110 of a base station 105), or the UE 115 may experience relatively poor channel conditions (e.g., below one or more channel quality metrics) between the UE 115 and a base station 105. The UE 115 may discover a relay UE—for example, based on a discovery signal received from the relay UE—and may use the relay UE as a UE-to-network relay. The UE 115 may transmit messages to the selected relay UE, and the relay UE 115 may relay the messages to a base station 105. Similarly, the base station 105 may transmit messages to the relay UE 115, and the relay UE 115 may relay the messages to the UE 115. In some examples, the UE 115 may use a single relay UE 115 to relay communications between the UE 115 and the base station 105. Using a single relay UE 115 may be referred to as a single-hop sidelink-based relay (e.g., for an NR system or another system). In some other examples, the UE 115 may use a chain of multiple relay UEs to relay communications between the UE 115 and the base station 105, which may be referred to as a multi-hop sidelink-based relay.

In some examples, the UE 115 (e.g., a first UE 115) may determine a trigger event while connected with the network via a second UE 115 (e.g., a relay UE) operating as a UE-to-network relay. For example, the first UE 115 may determine a trigger event for a measurement report associated with the second UE and at least a third UE 115. The third UE 115 may be an example of a candidate UE-to-network relay for the first UE 115. The first UE 115 may transmit a measurement report to the network (e.g., via the second UE 115) based on the trigger event. A base station 105 may receive the measurement report and may determine to handover the first UE 115 from using the second UE 115 as the UE-to-network relay to using the third UE 115 as the UE-to-network relay in response to the measurement report. The base station 105 may transmit a handover command to the first UE 115 (e.g., via the second UE 115) to trigger a handover procedure. The first UE 115 may perform the handover procedure to switch relays (e.g., perform relay reselection). Based on the handover procedure, the first UE 115 may switch to communicating with the network via the third UE 115 (e.g., a relay UE) operating as the UE-to-network relay for the first UE 115.

Figure 2:
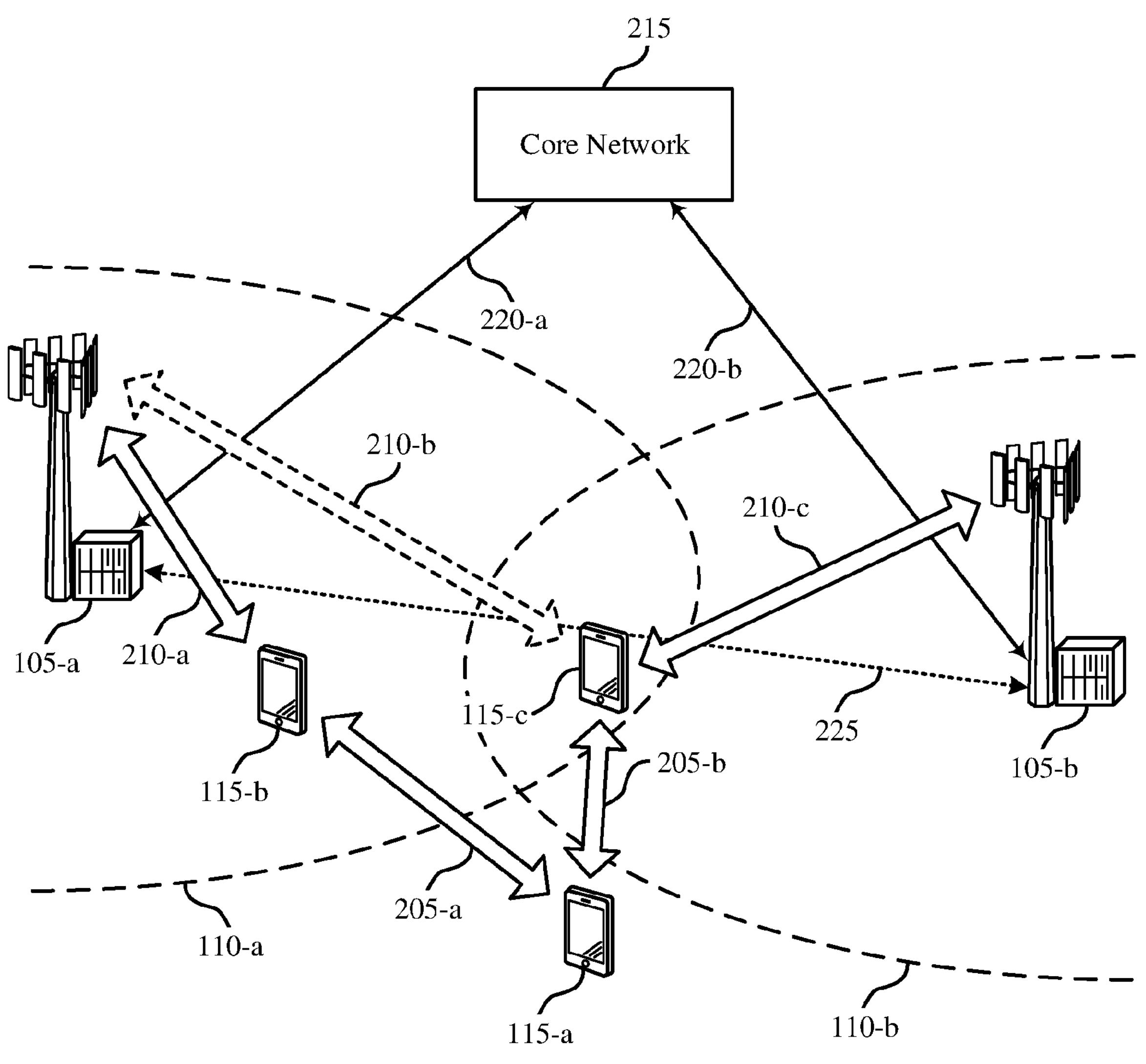

FIG. 2 illustrates an example of a wireless communications system 200 that supports measurement reporting and handover procedures between relay paths in accordance with aspects of the present disclosure. The wireless communications system 200 may be an example of a wireless communications system 100 as described with reference to FIG. 1. For example, the wireless communications system 200 may include a UE 115-*a*, a UE 115-*b*, a UE 115-*c*, a base station 105-*a*, a base station 105-*b*, or some combination of these wireless devices, which may be examples of the corresponding devices described with reference to FIG. 1. The base station 105-*a* and the base station 105-*b* may support a core network 215, such as a 5G core (5GC). The wireless communications system 200 may support a UE 115-*a* (e.g., a remote UE) switching between UE-to-network relays based on measurement reporting and a handover procedure.

The UE 115-*a* may be an example of a remote UE (e.g., a UE 115 outside the coverage area 110 for a base station 105). For example, the UE 115-*a* may be outside the coverage area 110-*a* for the base station 105-*a* and may be outside the coverage area 110-*b* for the base station 105-*b*. Accordingly, the location of the UE 115-*a* may not support a direct connection (e.g., a Uu connection) with a base station 105, or a channel metric for such a connection may fall below a threshold. Instead, to communicate with the core network 215, the UE 115-*a* may use a relay UE 115.

For example, the UE 115-*a* may determine to use a UE 115-*b* to relay communications between the UE 115-*a* and a base station 105-*a*. In such an example, the UE 115-*b* may operate as a sidelink-based UE-to-network relay. Additionally or alternatively, one or more of the techniques described herein with reference to UE-to-network relays may be applicable to UE-to-UE relays.

In some examples, relay UEs 115 may operate at specific layers to support relaying communications. For example, a layer 1 (L1) relay may simply receive a signal from a base station 105 and amplify the signal towards a UE 115. An L2 relay may relay information below a PDCP layer. For example, the L2 relay may forward messages between a PC5 bearer and a Uu bearer using an adaptation layer function. If the UE 115-*b* operates as an L2 relay UE for the UE 115-*a*, the data radio bearers (DRBs) for the UE 115-*a* may be controlled by the radio access network (RAN), such as an NG-RAN. The L2 relay UE may not support direct communication between the L2 relay UE 115-*b* and the remote UE 115-*a*. Instead, the L2 relay UE may forward traffic from the UE 115-*a* to the base station 105-*a* to terminate at the core network 215 (e.g., the 5GC). A layer 3 (L3) relay may be an example of an IP router. An L3 relay may use a protocol data unit (PDU) session for the L3 relay to forward traffic for a remote UE 115 to the core network 215. The L3 relay may further support local routing between a remote UE 115 and the L3 relay UE 115 or between two remote UEs 115. Additionally, the L3 relay may support non-IP traffic by encapsulation in IP traffic or using a dedicated PDU session specific to a remote UE 115.

As described herein, the UE 115-*a* may use a relay UE 115 (e.g., the UE 115-*b* or the UE 115-*c*) as an L2 relay. The UE 115-*a* may select and/or reselect an L2 relay UE based on one or more selection criteria, selection procedures or both. For example, the UE 115-*a* may receive discovery signals broadcast by one or more candidate relay UEs 115 (e.g., the UE 115-*b* and the UE 115-*c*) and may select a UE 115 from the candidate relay UEs 115 to operate as the L2 relay for the UE 115-*a* based on channel metrics or other selection criteria. In some cases, relay selection may involve relay UE authorization, remote UE authorization, or both. The wireless communications system 200 may use one or more mechanisms to support a threshold quality of service (QoS) for relaying functionality, to support service continuity for a remote UE 115, to support a secure relay connection, or to support some combination thereof. Additionally or alternatively, the wireless communications system 200 may support connection management of a relay connection using the user plane protocol stack, the control plane procedure, upper layer operations for discovery and sidelink relaying, physical layer operations for signaling, or some combination thereof.

In some cases, a UE 115-*a* (e.g., a remote UE 115) may communicate with a base station 105-*a* via an L2 relay UE 115-*b*. For example, the UE 115-*a* may communicate messages with the L2 relay UE 115-*b* via a PC5 connection 205-*a* (e.g., a sidelink channel, a D2D connection), and the L2 relay UE 115-*b* may communicate the messages with the base station 105-*a* via a Uu connection 210-*a* (e.g., an access channel). For example, the L2 relay UE 115-*b* may store a PC5-to-Uu bearer mapping indicating to forward signals received on a first PC5 connection 205-*a* over a first Uu connection 210-*a* and to forward signals received on the first Uu connection 210-*a* over the first PC5 connection 205-*a*. In some examples, the UE 115-*a* may initially communicate with the base station 105-*a* directly (e.g., via a Uu connection) but may perform a Uu-to-PC5 handover procedure to switch to using the L2 relay UE 115-*b* as a UE-to-network relay. In some other examples, the UE 115-*a* may perform a PC5-to-Uu handover procedure to switch from using the L2 relay UE 115-*b* as the UE-to-network relay to communicating directly with the base station 105-*a* via a Uu connection.

However, in some examples, the relay connection using the L2 relay UE 115-*b* may degrade (e.g., fail to satisfy a threshold), but a Uu connection with a base station 105 may be unavailable or may also correspond to a relatively poor connection quality. In some such examples, the UE 115-*a* may perform a PC5-to-PC5 handover procedure to switch from using a first UE 115-*b* as an L2 UE-to-network relay to using a second UE 115-*c* as the L2 UE-to-network relay. For example, based on mobility of the remote UE 115-*a*, the remote UE 115-*a* may handover from a first PC5 path to a second PC5 path. The measurement triggering, measurement reporting, and handover procedure supporting PC5-to-PC5 handover may be different from measurement triggering and reporting supporting PC5-to-Uu handover or Uu-to-PC5 handover. For example, the UE 115-*a* may support one or more trigger events based on one or more candidate relay UEs 115. Additionally or alternatively, the UE 115-*a* may transmit, in a measurement report, information related to one or more candidate relay UEs 115 to support PC5-to-PC5 handover from a current relay UE 115 to a candidate relay UE 115.

As illustrated in FIG. 2, the UE 115-*a* may initially communicate with the base station 105-*a* via a UE 115-*b*. The UE 115-*b* may act as an L2 relay, relaying messages between a PC5 connection 205-*a* and a Uu connection 210-*a*. The base station 105-*a* may support a core network 215 via an N2 connection 220-*a*. Based on a trigger event, the UE 115-*a* may generate a measurement report. The measurement report may include information related to the current relay UE 115-*b* and one or more candidate relay UEs 115 (e.g., including at least a UE 115-*c*). Additionally or alternatively, the measurement report may include information related to one or more cells or base stations 105. The UE 115-*a* may transmit the measurement report to the base station 105-*a* (e.g., via the relay UE 115-*b*). The base station 105-*a* may determine whether to handover the UE 115-*a* to a different connection (e.g., a different PC5 path) based on information in the measurement report.

For example, the base station 105-*a* may determine to switch the UE 115-*a* from using the UE 115-*b* as a UE-to-network relay to using the UE 115-*c* as a UE-to-network relay based on the measurement report. The base station 105-*a* may transmit a handover command to the UE 115-*a* (e.g., via the UE 115-*b*). The UE 115-*a* may receive the handover command and—in response to the handover command—may perform a handover procedure to select the UE 115-*c* as the L2 relay. Correspondingly, the UE 115-*c* may act as an L2 relay, relaying messages between a PC5 connection 205-*b* and a Uu connection 210. In some examples, the UE 115-*c* may be connected to the same base station 105-*a*, the same cell, or both via a Uu connection 210-*b*. In some other examples, the UE 115-*c* may be connected to a different base station 105-*b*, a different cell, or both via a Uu connection 210-*c*. The different base station 105-*b* may also be connected to the core network 215 via an N2 connection 220-*b*. Additionally or alternatively, the base station 105-*a* and the base station 105-*b* may be connected (e.g., wired or wirelessly) via an Xn connection 225. Accordingly, the base station 105-*a* may support handing over the UE 115-*a* from a first relay path with the base station 105-*a* to a second relay path with the base station 105-*a*, a third relay path with a different base station 105-*b*, a first direct path with the base station 105-*a*, or a second direct path with a different base station 105-*b*. Such handover flexibility may improve communication reliability and connection continuity between a remote UE 115-*a* and the network (e.g., the core network 215).

Figure 3:
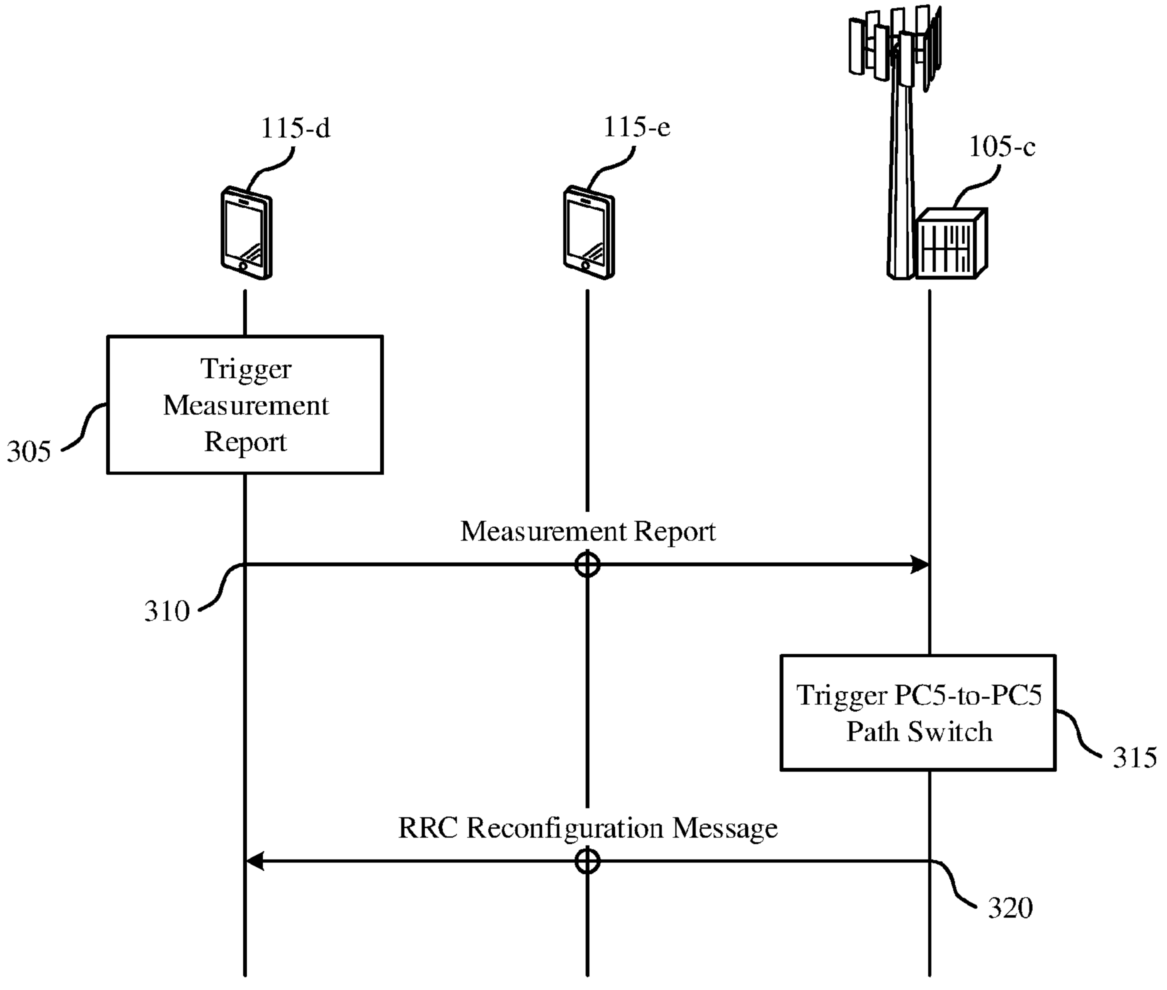
FIGS. 3 and 4 illustrate examples of process flows that support measurement reporting and handover procedures between relay paths in accordance with aspects of the present disclosure.

FIG. 3 illustrates an example of a process flow 300 that supports measurement reporting and handover procedures between relay paths in accordance with aspects of the present disclosure. The process flow 300 may be implemented by a wireless communications system 100 or a wireless communications system 200 as described with reference to FIGS. 1 and 2. The process flow 300 may include a first UE 115-*d* (e.g., a remote UE 115), a relay UE 115-*e* (e.g., an L2 relay), and a base station 105-*c*, which may be examples of the corresponding devices described with reference to FIGS. 1 and 2. The UE 115-*d* may communicate with the base station 105-*c* via the UE 115-*e* operating as a UE-to-network relay. Alternative examples of the following may be implemented, where some processes are performed in a different order than described or are not performed at all. In some cases, processes may include additional features not mentioned below, or further processes may be added.

At 305, the UE 115-*d* may trigger a measurement report. The UE 115-*d* may support one or more trigger events. In some cases, the UE 115-*d* may be pre-configured with a set of trigger events for triggering a measurement report transmission. In some other cases, one or more trigger events may be configured or partially configured by the base station 105-*c*. For example, the base station 105-*c* may configure the UE 115-*d* with one or more thresholds for one or more trigger events. Additionally or alternatively, the base station 105-*c* may configure the UE 115-*d* with criteria for determining handover candidates. For example, the base station 105-*c* may indicate to the UE 115-*d* whether the UE 115-*d* is to consider the base station 105-*c*, relays served by the same base station 105-*c* as the current relay UE 115-*e*, relays served by the same public land mobile network (PLMN) as the current relay UE 115-*e*, other base stations 105, relays served by other base stations 105, relays served by other PLMNs, or some combination thereof as potential handover candidates. The base station 105-*c* may configure the UE 115-*d* with one or more parameters (e.g., threshold values, rules) for trigger events using a radio resource control (RRC) configuration message, a downlink control information (DCI) message, a medium access control (MAC) control element (CE), a system information message, or any other configuration message.

In a first example, the UE 115-*d* may determine the trigger event for the measurement report based on a channel metric for the current relay connection. For example, the UE 115-*d* may measure a channel metric for the relay connection using the relay UE 115-*e*. The channel metric may correspond to the sidelink channel (e.g., the PC5 connection) between the remote UE 115-*d* and the relay UE 115-*e*, the access channel (e.g., the Uu connection) between the relay UE 115-*e* and the base station 105-*c*, or both. In some cases, a channel metric may be an example of a reference signal received power (RSRP), a reference signal received quality (RSRQ), a received signal strength indicator (RSSI), a signal-to-noise ratio (SNR), a signal-to-interference-plus-noise ratio (SINR), or some other channel metric indicating a quality of a channel. The UE 115-*d* may compare the measured channel metric for the current relay connection to a threshold value. If the channel metric for the current relay connection fails to satisfy the threshold value (e.g., a sidelink RSRP for the serving relay UE 115-*e* is below a threshold RSRP value), the UE 115-*d* may trigger a measurement report. Additionally or alternatively, the trigger event may involve a channel metric for the current relay connection failing to satisfy a first threshold value and a channel metric for a candidate relay satisfying a second threshold value (e.g., a candidate relay sidelink RSRP is greater than or equal to the second threshold value). The first threshold value and the second threshold value may be the same value or different values. Such threshold values may be configured by the network, dynamically determined by the UE 115-*d*, or pre-configured at the UE 115-*d*.

In a second example, the UE 115-*d* may determine the trigger event for the measurement report based on a difference between channel metrics for the current relay connection and a candidate relay connection. For example, the UE 115-*d* may trigger a measurement report transmission if the offset between a channel metric for a candidate relay connection (e.g., a candidate relay sidelink RSRP) and the channel metric for the current relay connection (e.g., the current relay sidelink RSRP) satisfies an offset threshold value (e.g., is greater than or equal to a threshold RSRP difference).

In a third example, the UE 115-*d* may determine the trigger event for the measurement report based on a channel metric for the current relay connection (e.g., the current relay sidelink RSRP) satisfying a first threshold value and either a channel metric for a candidate direct connection with a base station 105 (e.g., a candidate Uu cell RSRP) satisfying a second threshold value or a channel metric for a candidate sidelink connection with a relay UE 115 (e.g., a candidate relay sidelink RSRP) satisfying a third threshold value.

In any of the described examples, the UE 115-*d* may determine the candidate relays, candidate cells, or both based on the supported candidates for a handover procedure. For example, a candidate relay may be associated with the same or a different cell, PLMN, or both as the current relay UE 115-*e* based on a configuration of the UE 115-*d*. Similarly, a candidate base station 105 for a candidate direct connection may correspond to the same or a different serving cell, PLMN, or both as the current relay UE 115-*e* based on the configuration of the UE 115-*d*. The configuration of the UE 115-*d* may be pre-configured or configured by the network using a configuration message as described herein (e.g., an RRC message). The UE 115-*d* may monitor for discovery signals (e.g., discovery messages) from potential relay candidates and may determine a set of UEs 115 corresponding to candidate UE-to-network relays based on the received discovery messages, criteria for candidate UE-to-network relays, or both. Additionally or alternatively, the UE 115-*d* may use the received discovery signals to determine channel metrics or other information associated with the candidate relays for measurement reporting.

In response to triggering the measurement report, at 310, the UE 115-*d* may transmit a measurement report to the base station 105-*c* (e.g., via the relay UE 115-*e*). In some examples, the UE 115-*d* may perform one or more measurements and generate the measurement report based on the trigger event. In some other examples, the UE 115-*e* may automatically perform the measurements (e.g., regardless of the trigger event) and may generate and transmit the measurement report based on the trigger event.

The measurement report may be an example of a MeasureReport message. The measurement report may include information related to one or more PC5 connections, one or more Uu connections, or both. For example, the measurement report may include fields related to available PC5 measurements (e.g., measurements for the current relay UE 115-*e* and candidate relay UEs 115), available Uu measurements (e.g., measurements for the currently serving base station 105-*c* and other candidate base stations 105), or a combination thereof. The measurement report may include, for a relay UE 115 (e.g., the current relay or a candidate relay), a channel metric for a PC5 connection (e.g., RSRP, RSRQ, RSSI, SNR, SINR, or another channel metric), a relay UE identifier (ID), relay assistance information, or some combination thereof. Relay assistance information may include load information of the relay, such as a constant bit rate (CBR) or resource utilization; battery or power information for the relay, such as a current battery level or total power capability; the current RRC state of the UE, such as an IDLE state, an INACTIVE state, or a CONNECTED state; the serving or camping cell ID associated with the relay, such as a cell global identity (CGI) or a physical cell identifier (PCI); a PLMN ID associated with the relay; or any combination of these values or other relay assistance information. Additionally or alternatively, the measurement report may include, for a base station 105 (e.g., the current serving base station or a candidate base station), a channel metric for a Uu connection (e.g., RSRP, RSRQ, RSSI, SNR, SINR, or another channel metric), a corresponding cell ID (e.g., a PCI or CGI), or any combination of these values or other base station or cell-related information.

In some examples, the UE 115-*d* may include information in the measurement report for the current relay UE 115-*e* and any available candidates (e.g., candidate relays, candidate base stations, or both). In some other examples, the UE 115-*d* may include information in the measurement report for the current relay UE 115-*e* and one or more candidates satisfying a threshold (e.g., a threshold for the trigger event at 305). For example, if the measurement report is triggered based on a specific candidate relay UE 115, the UE 115-*d* may include information in the measurement report related to the current relay UE 115-*e* and the specific candidate relay UE 115, such that the base station 105-*c* may determine whether to handover the UE 115-*d* to the specific candidate relay UE 115.

The base station 105-*c* may receive the measurement report at 310. In some examples, the measurement report may trigger a PC5-to-PC5 path switch for the UE 115-*d* at 315. For example, the base station 105-*c* may compare one or more measurements in the measurement report to other measurements in the measurement report, to one or more thresholds (e.g., configured for the network), or both. The base station 105-*c* may select a candidate relay UE 115 for the remote UE 115-*d*. For example, the UE 115-*d* using the selected candidate relay UE 115 as a UE-to-network relay may support more reliable communications, higher throughput, or both as compared to continuing to use the current relay UE 115-*e* as the UE-to-network relay.

At 320, to indicate the PC5-to-PC5 path switch, the base station 105-*c* may transmit an RRC reconfiguration message to the UE 115-*d* (e.g., via the relay UE 115-*e*). The RRC reconfiguration message may include or be an example of a handover command. The RRC reconfiguration message may indicate the selected candidate relay UE 115. Based on the RRC reconfiguration message, the UE 115-*d* may perform a handover procedure from the UE 115-*e* operating as a UE-to-network relay to the selected candidate relay UE 115 operating as the UE-to-network relay. Accordingly, the UE 115-*d* may communicate with the base station 105-*c* via the selected candidate relay UE 115 operating as the UE-to-network relay based on the handover procedure.

Figure 4:
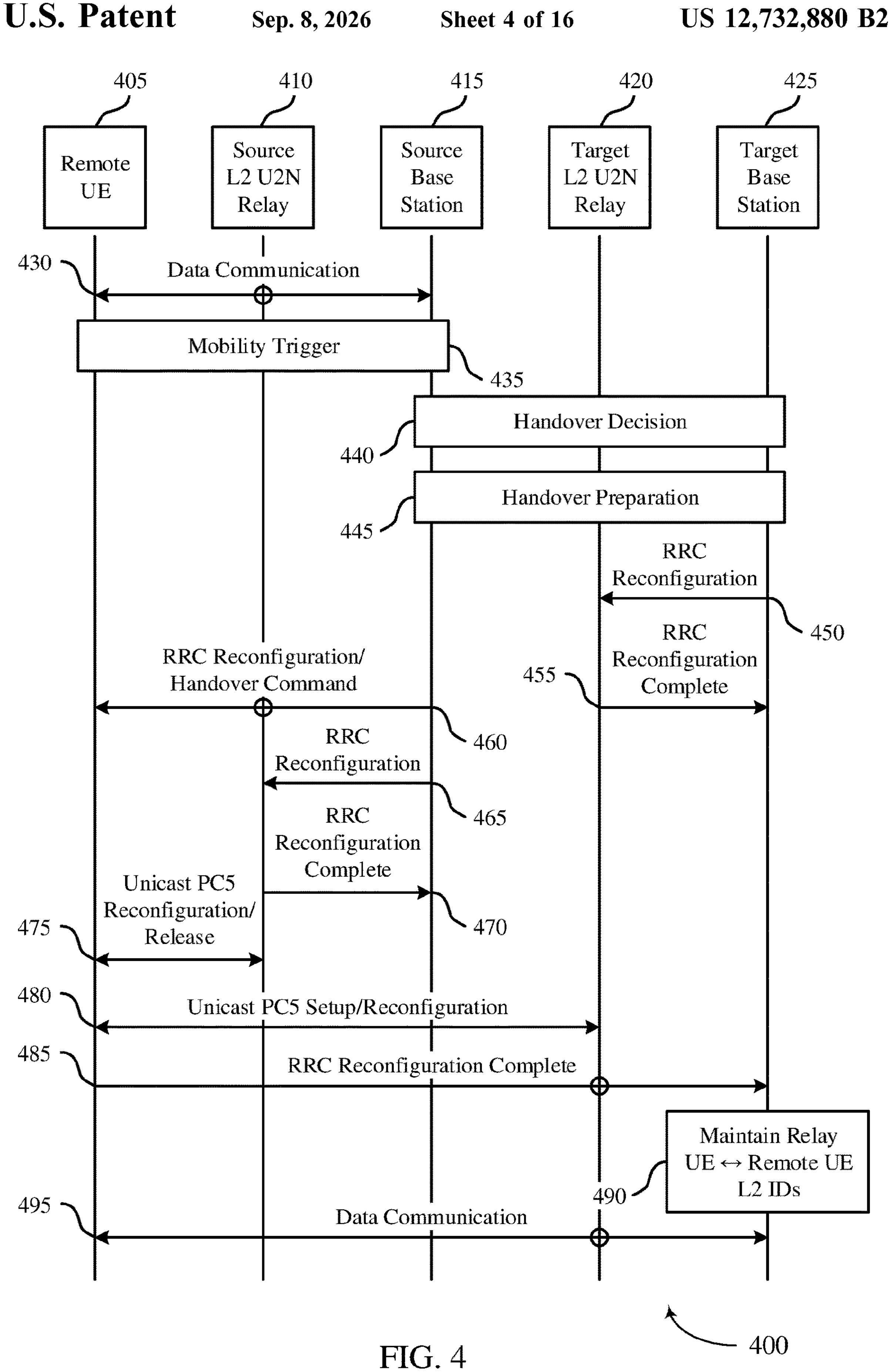

FIG. 4 illustrates an example of a process flow 400 that supports measurement reporting and handover procedures between relay paths in accordance with aspects of the present disclosure. The process flow 400 may be implemented by a wireless communications system 100 or a wireless communications system 200 as described with reference to FIGS. 1 and 2. The process flow 400 may include aspects of the process flow 300. The process flow 400 may include a remote UE 405, a source L2 UE-to-network relay 410, and a target L2 UE-to-network relay 420, which may be examples of UEs 115 as described with reference to FIGS. 1 through 3. Additionally, the process flow 400 may include a source base station 415 and a target base station 425, which may be examples of base stations 105 as described with reference to FIGS. 1 through 3. The process flow 400 may support handing over a remote UE 405 from one cell (e.g., supported by the source base station 415) to another (e.g., supported by the target base station 425) in a PC5-to-PC5 handover procedure. Alternative examples of the following may be implemented, where some processes are performed in a different order than described or are not performed at all. In some cases, processes may include additional features not mentioned below, or further processes may be added.

At 430, the remote UE 405 may communicate with the source base station 415 via a source L2 UE-to-network relay 410. For example, the source L2 UE-to-network relay 410 may forward data communications between the remote UE 405 and the source base station 415 using an adaptation layer function (e.g., below the PDCP). The source L2 UE-to-network relay 410 may be configured with a PC5-to-Uu bearer mapping between the PC5 connection with the remote UE 405 and the Uu connection with the source base station 415. Accordingly, if the source L2 UE-to-network relay 410 receives an uplink message from the remote UE 405 over the PC5 connection, the source L2 UE-to-network relay 410 may forward the uplink message on the corresponding Uu connection based on the PC5-to-Uu bearer mapping. Similarly, if the source L2 UE-to-network relay 410 receives a downlink message from the source base station 415 on the Uu connection, the source L2 UE-to-network relay 410 may forward the downlink message to the remote UE 405 on the corresponding PC5 connection based on the PC5-to-Uu bearer mapping.

At 435, the remote UE 405 may determine a trigger event, such as a mobility trigger (e.g., a trigger event based on the mobility of the remote UE 405 effecting one or more connections, such as the PC5 connection with the source L2 UE-to-network relay 410). The remote UE 405 may perform measurement reporting based on the trigger event. For example, the remote UE 405 may generate a measurement report (e.g., a MeasureReport message or another uplink message) and may transmit the measurement report to the source base station 415 via the source L2 UE-to-network relay 410.

At 440, the network may make a handover decision. For example, based on the measurement report received at the source base station 415, the network may determine to handover the remote UE 405 from the source L2 UE-to-network relay 410 to a target L2 UE-to-network relay 420. The measurement report may include information for at least the source L2 UE-to-network relay 410 and the target L2 UE-to-network relay 420. As illustrated, the target L2 UE-to-network relay 420 may be served by a target base station 425. Alternatively, the source base station 415 may additionally serve the target L2 UE-to-network relay 420.

At 445, the network may perform handover preparation. For example, the network may generate a handover command for the remote UE 405. In some cases, the handover command may be included within an RRC reconfiguration message.

At 450, the network may indicate a PC5-to-Uu bearer mapping to the target L2 UE-to-network relay 420. For example, the target base station 425 may transmit an RRC reconfiguration message to the target L2 UE-to-network relay 420 indicating a PC5-to-Uu bearer mapping to support L2 relaying between the remote UE 405 and the target base station 425 based on the handover decision. The target L2 UE-to-network relay 420 may update a configuration with the PC5-to-Uu bearer mapping and, at 455, the target L2 UE-to-network relay 420 may transmit an RRC reconfiguration complete message in response to the target base station 425.

At 460, the source base station 415 may transmit an RRC reconfiguration message including the handover command to the remote UE 405, for example, via the source L2 UE-to-network relay 410. The handover command may indicate a PC5 RLC channel configuration for relaying. For example, the PC5 RLC channel configuration may configure the remote UE 405 with a PC5 connection with the target L2 UE-to-network relay 420, such that the target L2 UE-to-network relay 420 may relay communications between the remote UE 405 and the target base station 425. In some examples, the handover command may further include a Uu signaling radio bearer (SRB), a Uu DRB, or both. In response to receiving the handover command, the remote UE 405 may release a PC5 RLC channel for relaying via the source L2 UE-to-network relay 410.

At 465, the source base station 415 may transmit an RRC reconfiguration message to the source L2 UE-to-network relay 410 indicating a PC5-to-Uu bearer mapping release. The source L2 UE-to-network relay 410 may release the PC5-to-Uu bearer mapping supporting relaying of messages between the remote UE 405 and the source base station 415 based on the received RRC reconfiguration message. At 470, the source L2 UE-to-network relay 410 may transmit an RRC reconfiguration complete message to the source base station 415 indicating that the source L2 UE-to-network relay 410 released the PC5-to-Uu bearer mapping and is no longer operating as the UE-to-network relay for the remote UE 405.

At 475, the remote UE 405 and the source L2 UE-to-network relay 410 may release or reconfigure the PC5 connection between the remote UE 405 and the source L2 UE-to-network relay 410. For example, if a non-relay PC5 link exists between the remote UE 405 and the source L2 UE-to-network relay 410, the remote UE 405 and the source L2 UE-to-network relay 410 may reconfigure the unicast PC5 link to no longer support L2 relaying. If a non-relay PC5 link does not exist between the remote UE 405 and the source L2 UE-to-network relay 410 (e.g., the unicast PC5 link is an L2 relay link), the remote UE 405 and the source L2 UE-to-network relay 410 may release the PC5 link. As such, the handover procedure may maintain existing sidelink connections between UEs 115 while also switching PC5 relay paths. In some cases, the source base station 415 may transmit a remote UE context release message to the source L2 UE-to-network relay 410 to trigger the PC5 link reconfiguration or release. In some other cases, the remote UE 405 may release the PC5 RLC channel configuration for relaying between the remote UE 405 and the source L2 UE-to-network relay 410, triggering the PC5 link reconfiguration or release.

At 480, the remote UE 405 and the target L2 UE-to-network relay 420 may setup or reconfigure a unicast PC5 link to support L2 relaying by the target L2 UE-to-network relay 420. For example, if the remote UE 405 and the target L2 UE-to-network relay 420 have an existing non-relay PC5 link, the remote UE 405 and the target L2 UE-to-network relay 420 may reconfigure the existing link to support L2 relaying. If the remote UE 405 and the target L2 UE-to-network relay 420 do not currently have a PC5 link, the remote UE 405 and the target L2 UE-to-network relay 420 may establish a PC5 link for relaying. The reconfiguration or setup of the PC5 link for relaying may be based on the PC5 RLC channel configuration for relaying received by the remote UE 405 at 460. Based on the PC5 link reconfiguration or setup, the target L2 UE-to-network relay 420 may support L2 relaying between the remote UE 405 and the target base station 425.

At 485, the remote UE 405 may transmit an RRC reconfiguration complete message to the target base station 425 via the target L2 UE-to-network relay 420 (e.g., the updated L2 UE-to-network relay based on the handover procedure). The RRC reconfiguration complete message may indicate that the PC5 link between the remote UE 405 and the target L2 UE-to-network relay 420 is configured according to the PC5 RLC channel configuration.

At 490, the network may maintain the relay UE-to-remote UE L2 IDs based on the handover procedure. For example, the relay UE-to-remote UE L2 IDs may be based on the PC5-to-Uu bearer mapping configured at the target L2 UE-to-network relay 420. The target base station 425 may store the relay UE-to-remote UE L2 IDs, such that the target base station 425 may transmit messages intended for the remote UE 405 to the target L2 UE-to-network relay 420. For example, at 495, the target L2 UE-to-network relay 420 may forward data communications between the remote UE 405 and the target base station 425 as described herein with reference to the source L2 UE-to-network relay 410 based on the completed PC5-to-PC5 handover procedure.

Figure 5:
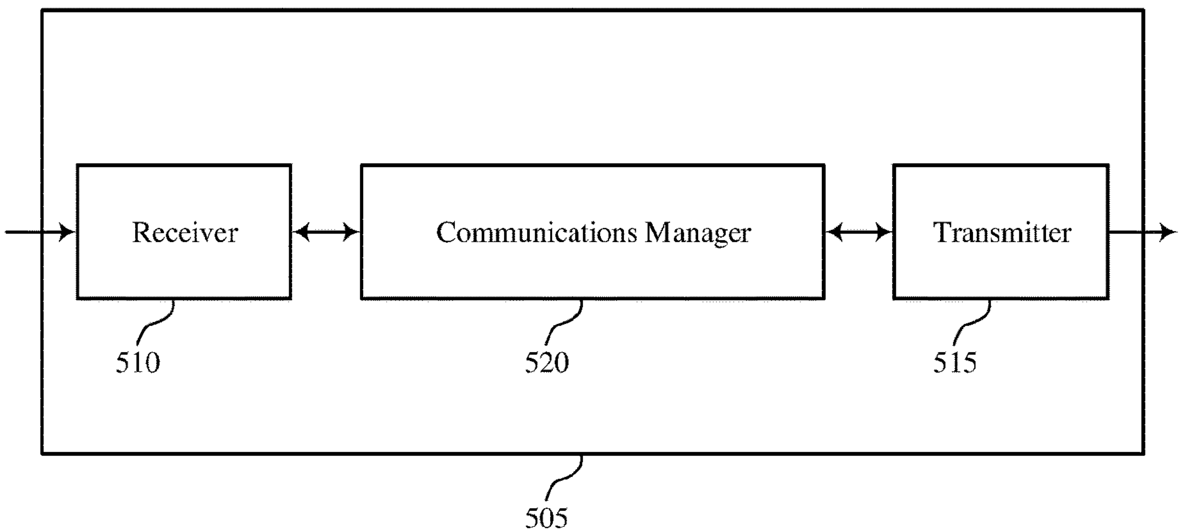
FIGS. 5 and 6 show block diagrams of devices that support measurement reporting and handover procedures between relay paths in accordance with aspects of the present disclosure.
Figure 5:

FIG. 5 shows a block diagram 500 of a device 505 that supports measurement reporting and handover procedures between relay paths in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to measurement reporting and handover procedures between relay paths). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to measurement reporting and handover procedures between relay paths). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of measurement reporting and handover procedures between relay paths as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. For example, the communications manager 520 may be configured as or otherwise support a means for communicating with a network via a second UE operating as a UE-to-network relay. The communications manager 520 may be configured as or otherwise support a means for determining a trigger event for a measurement report associated with the second UE and at least a third UE corresponding to a candidate UE-to-network relay. The communications manager 520 may be configured as or otherwise support a means for transmitting the measurement report based on the trigger event. The communications manager 520 may be configured as or otherwise support a means for performing a handover procedure from the second UE operating as the UE-to-network relay to the third UE operating as the UE-to-network relay. The communications manager 520 may be configured as or otherwise support a means for communicating with the network via the third UE operating as the UE-to-network relay based on the handover procedure.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improved channel throughput and message reliability. For example, the device 505 may switch relay paths to improve one or more channel metrics (e.g., RSRP, RSRQ, RSSI, SNR, SINR, etc.) associated with the relay paths. As such, switching the relay paths may allow the device 505 to transmit with a higher code rate, perform fewer retransmissions, or both as compared to maintaining the initial relay path or switching to a direct connection with a base station with poorer channel metrics. Increasing the code rate and reducing the number of retransmissions may reduce a number of times the processor ramps up processing power and turns on processing units to handle communications. Furthermore, reducing the number of retransmissions may reduce channel overhead.

Figure 6:
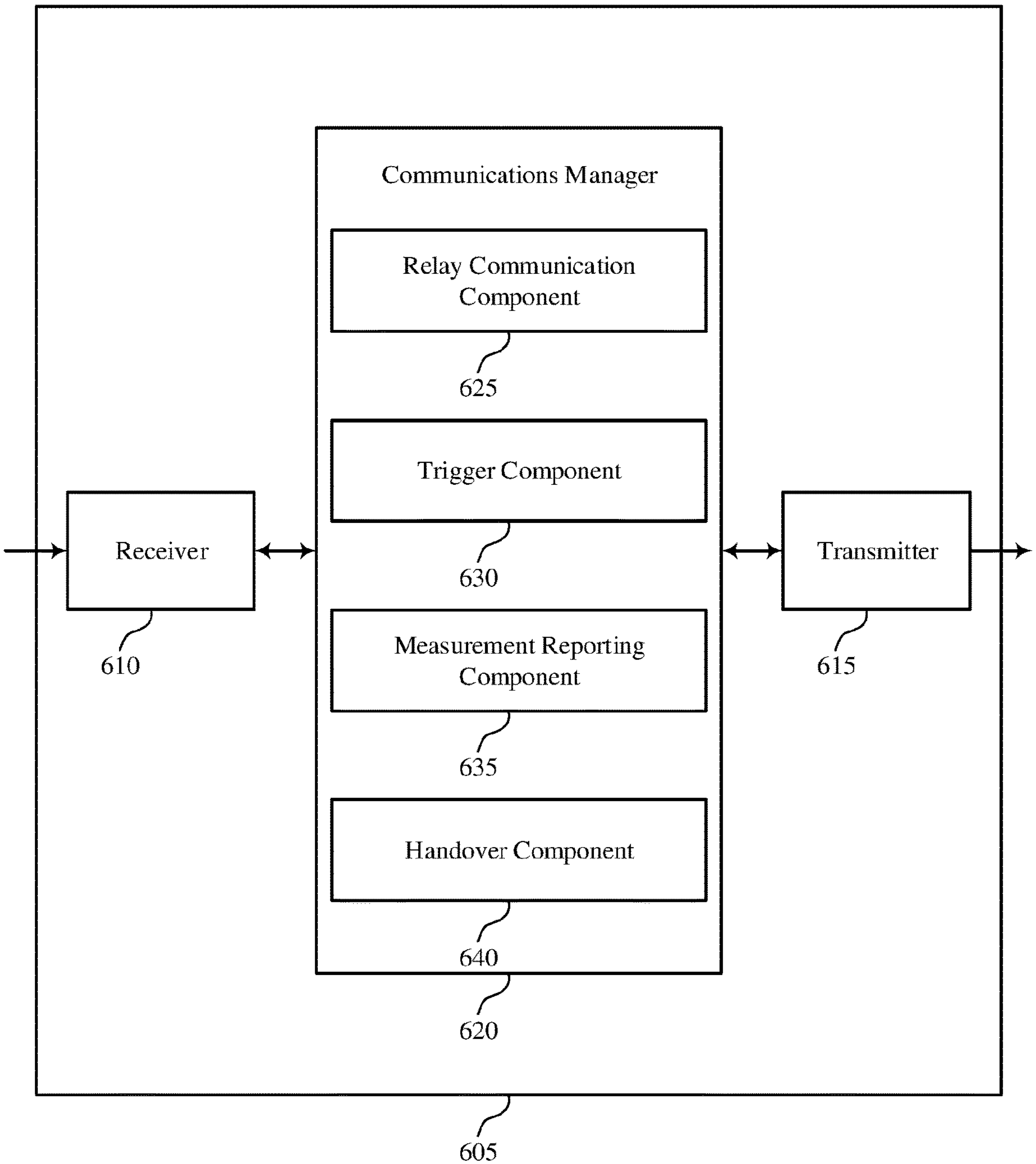

FIG. 6 shows a block diagram 600 of a device 605 that supports measurement reporting and handover procedures between relay paths in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to measurement reporting and handover procedures between relay paths). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to measurement reporting and handover procedures between relay paths). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of measurement reporting and handover procedures between relay paths as described herein. For example, the communications manager 620 may include a relay communication component 625, a trigger component 630, a measurement reporting component 635, a handover component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. The relay communication component 625 may be configured as or otherwise support a means for communicating with a network via a second UE operating as a UE-to-network relay. The trigger component 630 may be configured as or otherwise support a means for determining a trigger event for a measurement report associated with the second UE and at least a third UE corresponding to a candidate UE-to-network relay. The measurement reporting component 635 may be configured as or otherwise support a means for transmitting the measurement report based on the trigger event. The handover component 640 may be configured as or otherwise support a means for performing a handover procedure from the second UE operating as the UE-to-network relay to the third UE operating as the UE-to-network relay. The relay communication component 625 may be configured as or otherwise support a means for communicating with the network via the third UE operating as the UE-to-network relay based on the handover procedure.

Figure 7:
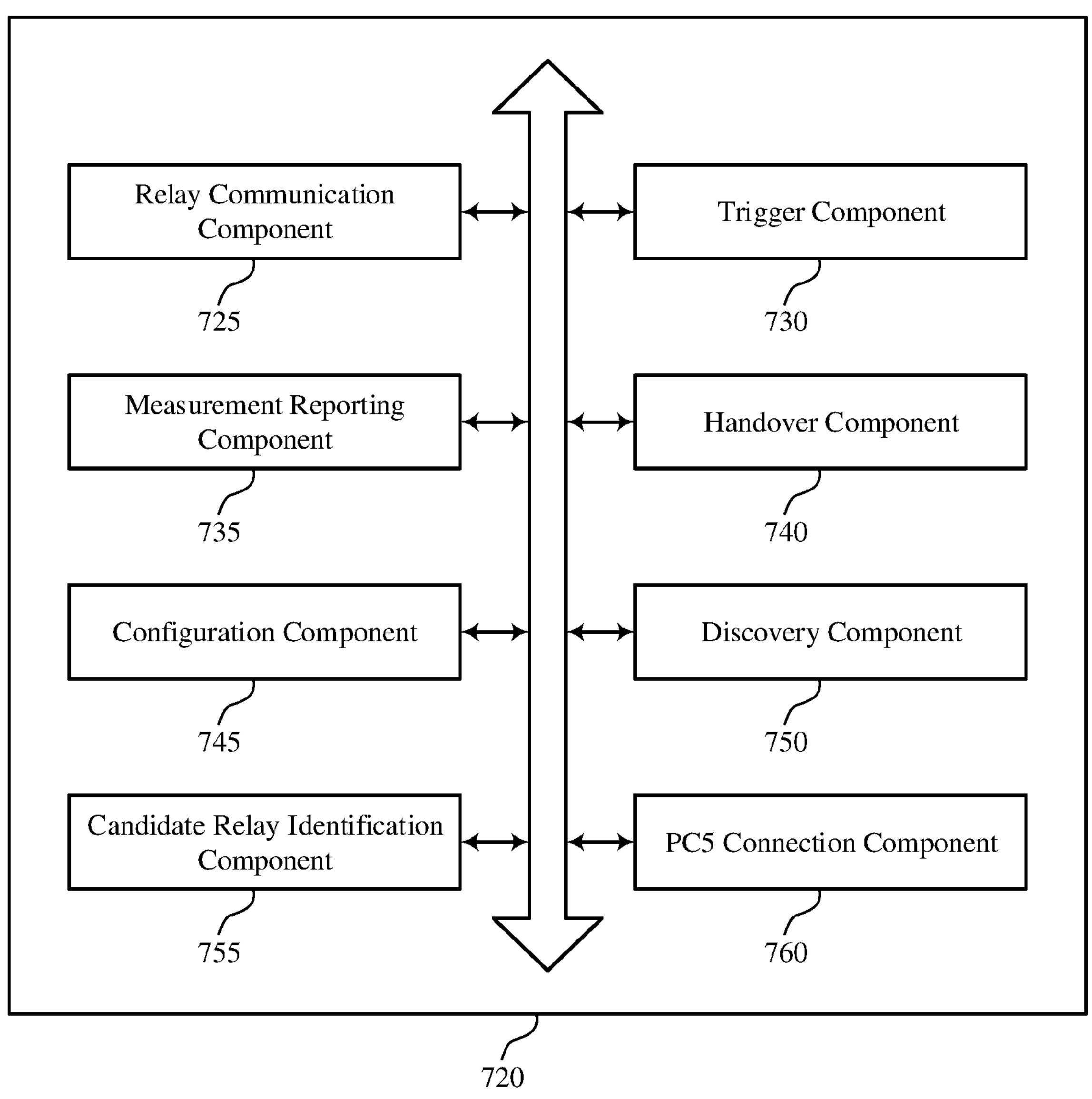
FIG. 7 shows a block diagram of a communications manager that supports measurement reporting and handover procedures between relay paths in accordance with aspects of the present disclosure.

FIG. 7 shows a block diagram 700 of a communications manager 720 that supports measurement reporting and handover procedures between relay paths in accordance with aspects of the present disclosure. The communications manager 720 may be an example of aspects of a communications manager 520, a communications manager 620, or both, as described herein. The communications manager 720, or various components thereof, may be an example of means for performing various aspects of measurement reporting and handover procedures between relay paths as described herein. For example, the communications manager 720 may include a relay communication component 725, a trigger component 730, a measurement reporting component 735, a handover component 740, a configuration component 745, a discovery component 750, a candidate relay identification component 755, a PC5 connection component 760, or any combination thereof. Each of these components may communicate, directly or indirectly, with one another (e.g., via one or more buses).

The communications manager 720 may support wireless communications at a first UE in accordance with examples as disclosed herein. The relay communication component 725 may be configured as or otherwise support a means for communicating with a network via a second UE operating as a UE-to-network relay. The trigger component 730 may be configured as or otherwise support a means for determining a trigger event for a measurement report associated with the second UE and at least a third UE corresponding to a candidate UE-to-network relay. The measurement reporting component 735 may be configured as or otherwise support a means for transmitting the measurement report based on the trigger event. The handover component 740 may be configured as or otherwise support a means for performing a handover procedure from the second UE operating as the UE-to-network relay to the third UE operating as the UE-to-network relay. In some examples, the relay communication component 725 may be configured as or otherwise support a means for communicating with the network via the third UE operating as the UE-to-network relay based on the handover procedure.

In some examples, the configuration component 745 may be configured as or otherwise support a means for receiving, from the network, a configuration message indicating one or more threshold values, where the trigger event for the measurement report is determined based on the one or more threshold values. In some examples, the configuration message may be an RRC message.

In some examples, to support determining the trigger event for the measurement report, the trigger component 730 may be configured as or otherwise support a means for determining that a first sidelink channel metric between the first UE and the second UE fails to satisfy a first threshold value. In some examples, to support determining the trigger event for the measurement report, the trigger component 730 may be configured as or otherwise support a means for determining that a second sidelink channel metric between the first UE and the third UE satisfies a second threshold value.

In some examples, to support determining the trigger event for the measurement report, the trigger component 730 may be configured as or otherwise support a means for determining that a difference between a first sidelink channel metric between the first UE and the second UE and a second sidelink channel metric between the first UE and the third UE satisfies a threshold offset value.

In some examples, to support determining the trigger event for the measurement report, the trigger component 730 may be configured as or otherwise support a means for determining that a first channel metric between the first UE and the second UE fails to satisfy a first threshold value. In some examples, to support determining the trigger event for the measurement report, the trigger component 730 may be configured as or otherwise support a means for determining that a second channel metric between the first UE and a base station satisfies a second threshold value.

In some examples, the discovery component 750 may be configured as or otherwise support a means for receiving a set of multiple discovery messages from a set of multiple UEs. In some examples, the candidate relay identification component 755 may be configured as or otherwise support a means for determining a set of UEs corresponding to candidate UE-to-network relays based on the set of multiple discovery messages, the set of UEs including at least the third UE.

In some examples, the configuration component 745 may be configured as or otherwise support a means for receiving, from the network, a configuration message indicating a criterion for the candidate UE-to-network relays for the trigger event, where determining the set of UEs corresponding to the candidate UE-to-network relays is based on the configuration message. In some examples, the criterion indicates that each candidate UE-to-network relay of the candidate UE-to-network relays corresponds to a same serving base station (e.g., same serving cell) as the first UE, each candidate UE-to-network relay of the candidate UE-to-network relays corresponds to a same PLMN ID as the first UE, or both. In some examples, the configuration message may be an RRC message.

In some examples, the measurement report includes a first sidelink channel metric corresponding to the second UE, a second sidelink channel metric corresponding to the third UE, a first relay ID for the second UE, a second relay ID for the third UE, first load information for the second UE, second load information for the third UE, first power information for the second UE, second power information for the third UE, a first RRC state for the second UE, a second RRC state for the third UE, a first serving cell ID for the second UE, a second serving cell ID for the third UE, a first PLMN ID associated with the second UE, a second PLMN ID associated with the third UE, a channel metric corresponding to a base station, a cell ID for the base station, or a combination thereof.

In some examples, to support performing the handover procedure, the handover component 740 may be configured as or otherwise support a means for receiving, from the network via the second UE, a handover command indicating a PC5 RLC channel configuration for the third UE. In some examples, to support performing the handover procedure, the PC5 connection component 760 may be configured as or otherwise support a means for reconfiguring an existing PC5 connection with the third UE based on the PC5 RLC channel configuration, where the third UE operates as the UE-to-network relay for the first UE based on the reconfiguring.

In some examples, to support performing the handover procedure, the handover component 740 may be configured as or otherwise support a means for receiving, from the network via the second UE, a handover command indicating a PC5 RLC channel configuration for the third UE. In some examples, to support performing the handover procedure, the PC5 connection component 760 may be configured as or otherwise support a means for establishing a PC5 connection with the third UE based on the PC5 RLC channel configuration, where the third UE operates as the UE-to-network relay for the first UE based on the establishing.

In some examples, to support performing the handover procedure, the PC5 connection component 760 may be configured as or otherwise support a means for transmitting, to the second UE, a message indicating a PC5 RLC channel reconfiguration for the second UE. In some examples, to support performing the handover procedure, the PC5 connection component 760 may be configured as or otherwise support a means for reconfiguring an existing PC5 connection with the second UE based on the PC5 RLC channel reconfiguration, where the second UE stops operating as the UE-to-network relay for the first UE based on the reconfiguring.

In some examples, to support performing the handover procedure, the PC5 connection component 760 may be configured as or otherwise support a means for transmitting, to the second UE, a message indicating a PC5 RLC channel release for the second UE. In some examples, to support performing the handover procedure, the PC5 connection component 760 may be configured as or otherwise support a means for releasing an existing PC5 connection with the second UE based on the PC5 RLC channel release, where the second UE stops operating as the UE-to-network relay for the first UE based on the releasing.

In some examples, the UE-to-network relay may be an example of an L2 UE-to-network relay supporting a PC5-to-Uu bearer mapping.

In some examples, the second UE relays first messages between the first UE and a first base station associated with a first PLMN ID. In some examples, the third UE relays second messages between the first UE and the first base station, the first UE and a second base station associated with the first PLMN ID, or the first UE and a third base station associated with a second PLMN ID.

In some examples, to support communicating with the network via the second UE operating as the UE-to-network relay, the relay communication component 725 may be configured as or otherwise support a means for transmitting a first uplink message to the second UE via a first PC5 interface and receiving a first downlink message from the second UE via the first PC5 interface. In some examples, to support communicating with the network via the third UE operating as the UE-to-network relay, the relay communication component 725 may be configured as or otherwise support a means for transmitting a second uplink message to the third UE via a second PC5 interface and receiving a second downlink message from the third UE via the second PC5 interface.

Figure 8:
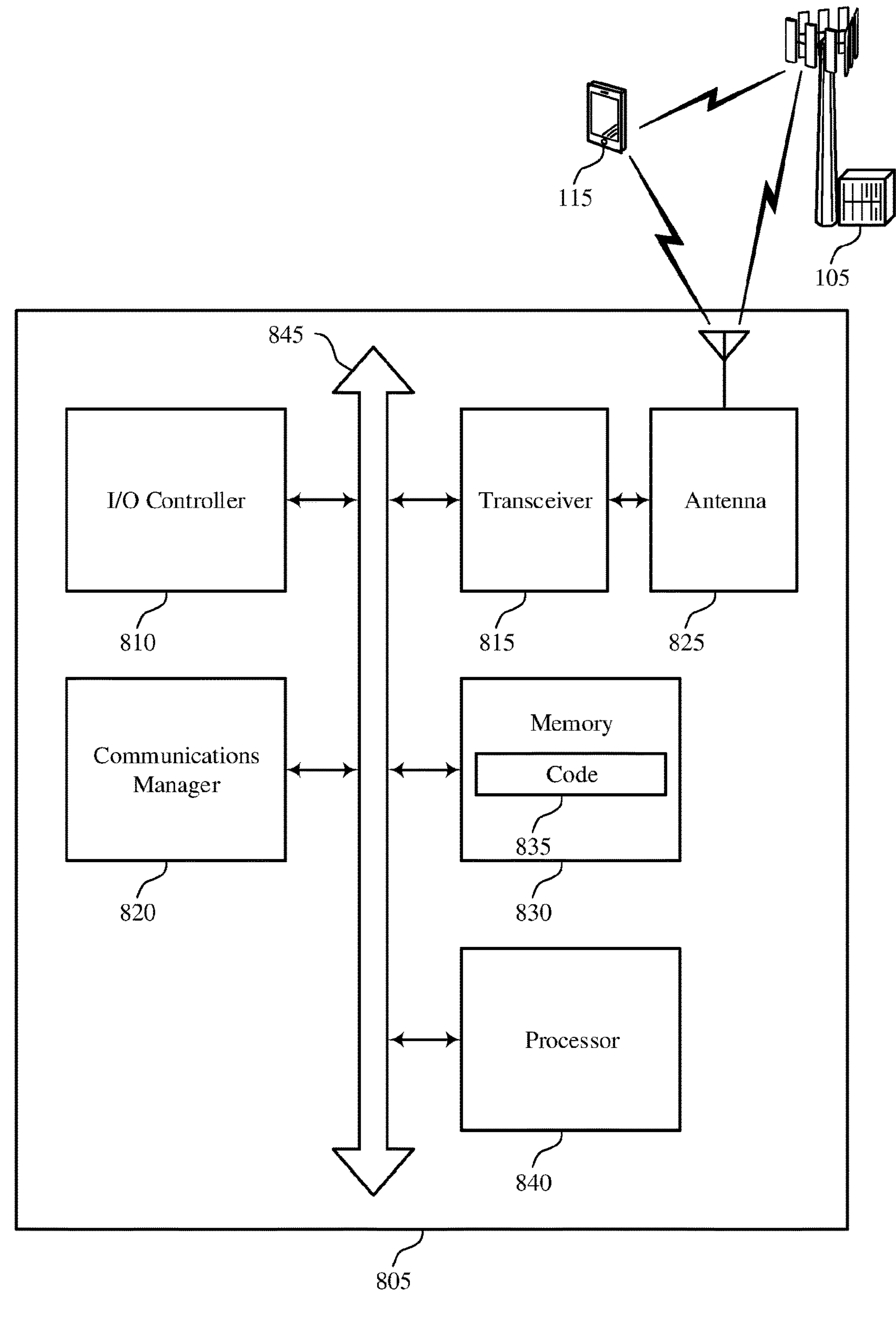
FIG. 8 shows a diagram of a system including a device that supports measurement reporting and handover procedures between relay paths in accordance with aspects of the present disclosure.

FIG. 8 shows a diagram of a system 800 including a device 805 that supports measurement reporting and handover procedures between relay paths in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting measurement reporting and handover procedures between relay paths). For example, the device 805 or a component of the device 805 may include a processor 840 and memory 830 coupled to the processor 840, the processor 840 and memory 830 configured to perform various functions described herein.

The communications manager 820 may support wireless communications at a first UE in accordance with examples as disclosed herein. For example, the communications manager 820 may be configured as or otherwise support a means for communicating with a network via a second UE operating as a UE-to-network relay. The communications manager 820 may be configured as or otherwise support a means for determining a trigger event for a measurement report associated with the second UE and at least a third UE corresponding to a candidate UE-to-network relay. The communications manager 820 may be configured as or otherwise support a means for transmitting the measurement report based on the trigger event. The communications manager 820 may be configured as or otherwise support a means for performing a handover procedure from the second UE operating as the UE-to-network relay to the third UE operating as the UE-to-network relay. The communications manager 820 may be configured as or otherwise support a means for communicating with the network via the third UE operating as the UE-to-network relay based on the handover procedure.

By including or configuring the communications manager 820 in accordance with examples as described herein, the device 805 may support techniques for improved communication reliability between the device 805 and a network (e.g., via an L2 relay). The device 805 may support trigger events and measurement reporting to indicate to the network that the device should perform a handover procedure between relay paths, for example, to improve one or more channel metrics associated with the relay paths. As such, switching the relay paths may allow the device 805 to transmit with a higher code rate, perform fewer retransmissions, or both as compared to maintaining the initial relay path or switching to a direct connection with a base station with poorer channel metrics than the L2 relay.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of measurement reporting and handover procedures between relay paths as described herein, or the processor 840 and the memory 830 may be otherwise configured to perform or support such operations.

Figure 9:
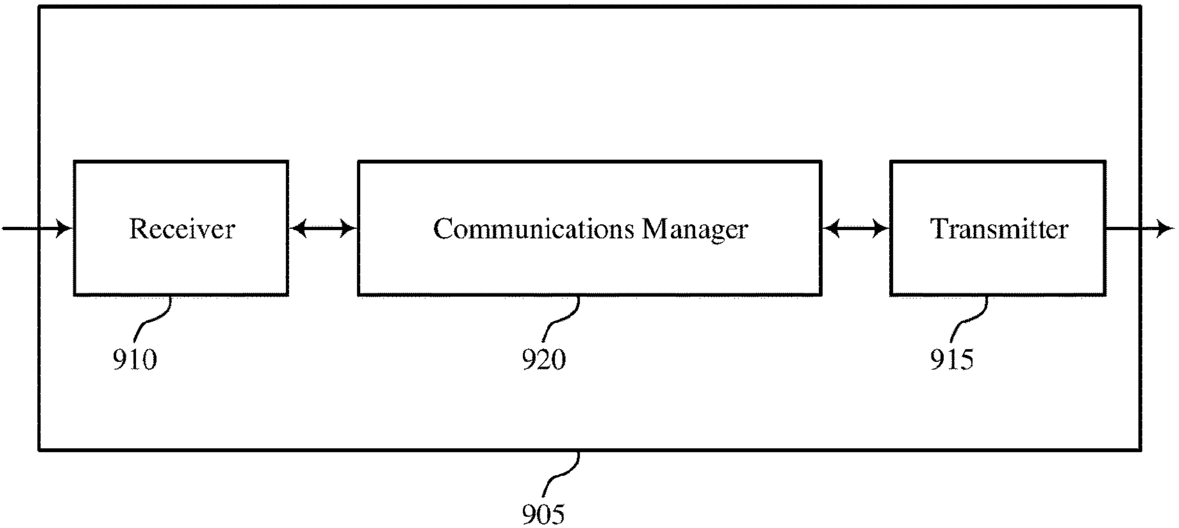
FIGS. 9 and 10 show block diagrams of devices that support measurement reporting and handover procedures between relay paths in accordance with aspects of the present disclosure.
Figure 9:

FIG. 9 shows a block diagram 900 of a device 905 that supports measurement reporting and handover procedures between relay paths in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to measurement reporting and handover procedures between relay paths). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to measurement reporting and handover procedures between relay paths). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of measurement reporting and handover procedures between relay paths as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for communicating with a first UE via a second UE operating as a UE-to-network relay. The communications manager 920 may be configured as or otherwise support a means for receiving, from the first UE via the second UE, a measurement report associated with the second UE and at least a third UE corresponding to a candidate UE-to-network relay. The communications manager 920 may be configured as or otherwise support a means for determining to handover the first UE from using the second UE as the UE-to-network relay to using the third UE as the UE-to-network relay based on the measurement report. The communications manager 920 may be configured as or otherwise support a means for transmitting a handover command to the first UE via the second UE based on determining to handover the first UE. The communications manager 920 may be configured as or otherwise support a means for communicating with the first UE via the third UE operating as the UE-to-network relay based on the handover command.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for improved channel throughput and message reliability. For example, the device 905 may transmit a handover command to trigger a UE 115 (e.g., a remote UE 115) to switch relay paths. Switching the relay paths may improve one or more channel metrics associated with the relay paths. As such, switching the relay paths may allow the device 905 to transmit with a higher code rate, perform fewer retransmissions, or both as compared to maintaining the initial relay path.

Figure 10:
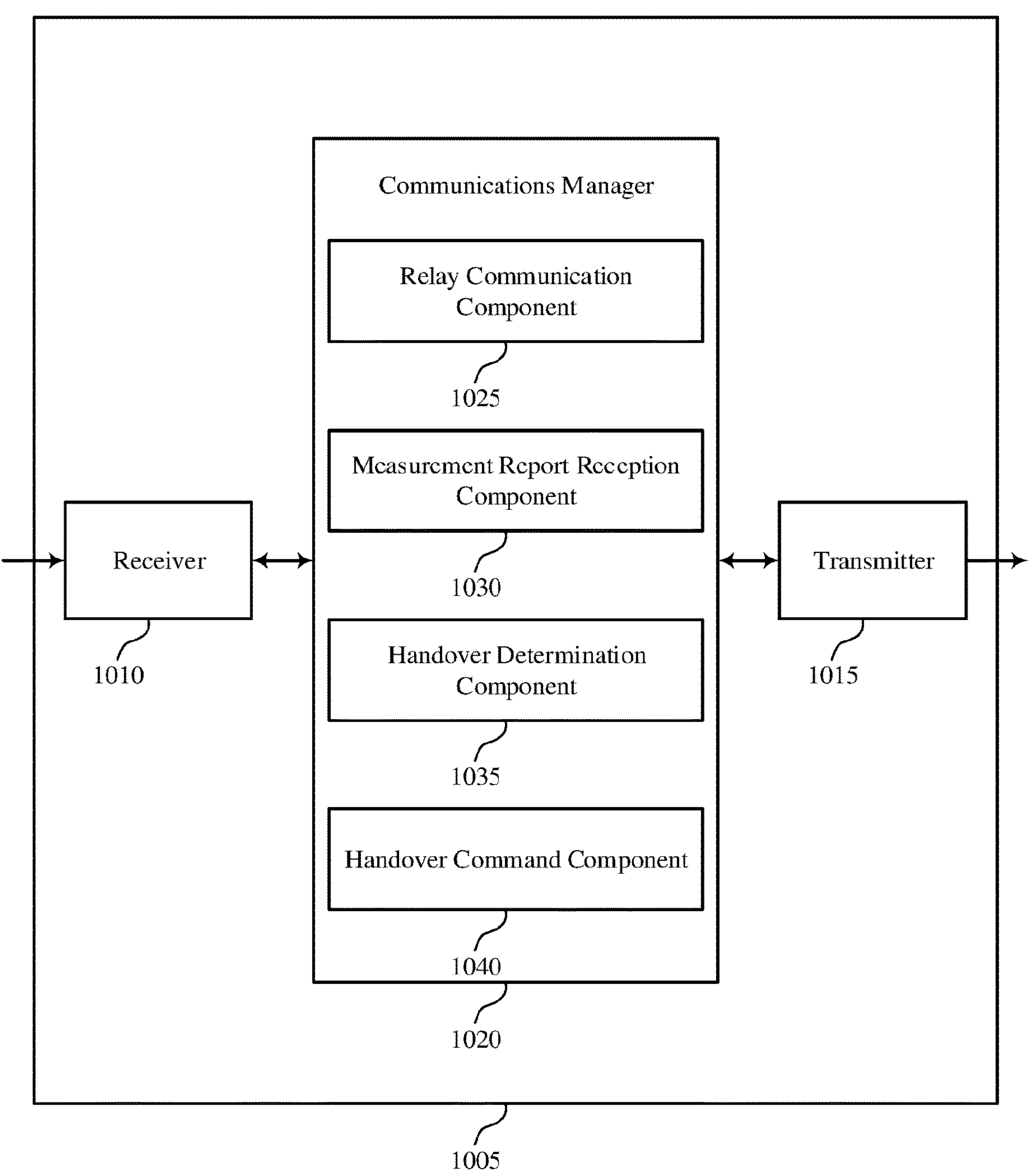

FIG. 10 shows a block diagram 1000 of a device 1005 that supports measurement reporting and handover procedures between relay paths in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to measurement reporting and handover procedures between relay paths). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to measurement reporting and handover procedures between relay paths). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of measurement reporting and handover procedures between relay paths as described herein. For example, the communications manager 1020 may include a relay communication component 1025, a measurement report reception component 1030, a handover determination component 1035, a handover command component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The relay communication component 1025 may be configured as or otherwise support a means for communicating with a first UE via a second UE operating as a UE-to-network relay. The measurement report reception component 1030 may be configured as or otherwise support a means for receiving, from the first UE via the second UE, a measurement report associated with the second UE and at least a third UE corresponding to a candidate UE-to-network relay. The handover determination component 1035 may be configured as or otherwise support a means for determining to handover the first UE from using the second UE as the UE-to-network relay to using the third UE as the UE-to-network relay based on the measurement report. The handover command component 1040 may be configured as or otherwise support a means for transmitting a handover command to the first UE via the second UE based on determining to handover the first UE. The relay communication component 1025 may be configured as or otherwise support a means for communicating with the first UE via the third UE operating as the UE-to-network relay based on the handover command.

Figure 11:
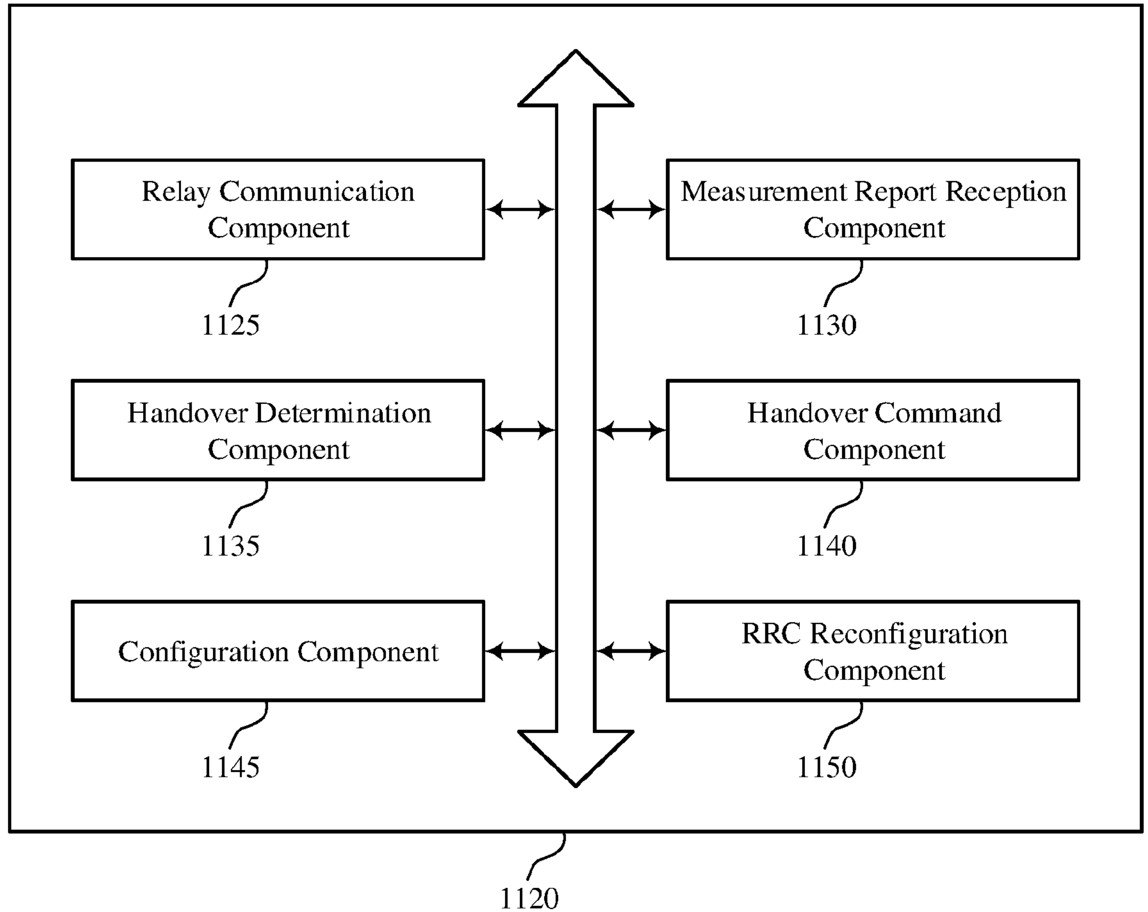
FIG. 11 shows a block diagram of a communications manager that supports measurement reporting and handover procedures between relay paths in accordance with aspects of the present disclosure.

FIG. 11 shows a block diagram 1100 of a communications manager 1120 that supports measurement reporting and handover procedures between relay paths in accordance with aspects of the present disclosure. The communications manager 1120 may be an example of aspects of a communications manager 920, a communications manager 1020, or both, as described herein. The communications manager 1120, or various components thereof, may be an example of means for performing various aspects of measurement reporting and handover procedures between relay paths as described herein. For example, the communications manager 1120 may include a relay communication component 1125, a measurement report reception component 1130, a handover determination component 1135, a handover command component 1140, a configuration component 1145, an RRC reconfiguration component 1150, or any combination thereof. Each of these components may communicate, directly or indirectly, with one another (e.g., via one or more buses).

The communications manager 1120 may support wireless communications at a base station in accordance with examples as disclosed herein. The relay communication component 1125 may be configured as or otherwise support a means for communicating with a first UE via a second UE operating as a UE-to-network relay. The measurement report reception component 1130 may be configured as or otherwise support a means for receiving, from the first UE via the second UE, a measurement report associated with the second UE and at least a third UE corresponding to a candidate UE-to-network relay. The handover determination component 1135 may be configured as or otherwise support a means for determining to handover the first UE from using the second UE as the UE-to-network relay to using the third UE as the UE-to-network relay based on the measurement report. The handover command component 1140 may be configured as or otherwise support a means for transmitting a handover command to the first UE via the second UE based on determining to handover the first UE. In some examples, the relay communication component 1125 may be configured as or otherwise support a means for communicating with the first UE via the third UE operating as the UE-to-network relay based on the handover command.

In some examples, the configuration component 1145 may be configured as or otherwise support a means for transmitting, to the first UE, a configuration message indicating one or more threshold values, where the measurement report is received based on a trigger event at the first UE triggering transmission of the measurement report based on the one or more threshold values. In some examples, the configuration message may be an example of an RRC message.

In some examples, the configuration component 1145 may be configured as or otherwise support a means for transmitting, to the first UE, a configuration message indicating a criterion for a set of candidate UE-to-network relays for the first UE, where the measurement report includes information for the set of candidate UE-to-network relays based on the criterion. In some examples, the criterion indicates that each candidate UE-to-network relay of the set of candidate UE-to-network relays corresponds to the base station serving the first UE, each candidate UE-to-network relay of the set of candidate UE-to-network relays corresponds to a same PLMN ID as the first UE, or both. In some examples, the configuration message may be an example of an RRC message.

In some examples, the measurement report includes a first sidelink channel metric corresponding to the second UE, a second sidelink channel metric corresponding to the third UE, a first relay ID for the second UE, a second relay ID for the third UE, first load information for the second UE, second load information for the third UE, first power information for the second UE, second power information for the third UE, a first RRC state for the second UE, a second RRC state for the third UE, a first serving cell ID for the second UE, a second serving cell ID for the third UE, a first PLMN ID associated with the second UE, a second PLMN ID associated with the third UE, a channel metric corresponding to a second base station, a cell ID for the second base station, or a combination thereof.

In some examples, the RRC reconfiguration component 1150 may be configured as or otherwise support a means for transmitting, to the third UE, an RRC reconfiguration message indicating a PC5-to-Uu bearer mapping, where the third UE operates as the UE-to-network relay for the first UE based on the PC5-to-Uu bearer mapping.

In some examples, the RRC reconfiguration component 1150 may be configured as or otherwise support a means for transmitting, to the second UE, an RRC reconfiguration message including an indication to release a PC5-to-Uu bearer mapping, where the second UE stops operating as the UE-to-network relay for the first UE based on the indication to release the PC5-to-Uu bearer mapping.

In some examples, the handover command indicates a PC5 RLC channel configuration for the first UE and the third UE. In some examples, the third UE operates as the UE-to-network relay for the first UE based on the PC5 RLC channel configuration.

In some examples, the UE-to-network relay may be an example of an L2 UE-to-network relay supporting a PC5-to-Uu bearer mapping.

In some examples, to support communicating with the first UE via the second UE operating as the UE-to-network relay, the relay communication component 1125 may be configured as or otherwise support a means for receiving a first uplink message from the second UE via a first Uu interface and transmitting a first downlink message to the second UE via the first Uu interface. In some examples, to support communicating with the first UE via the third UE operating as the UE-to-network relay, the relay communication component 1125 may be configured as or otherwise support a means for receiving a second uplink message from the third UE via a second Uu interface and transmitting a second downlink message to the third UE via the second Uu interface.

Figure 12:
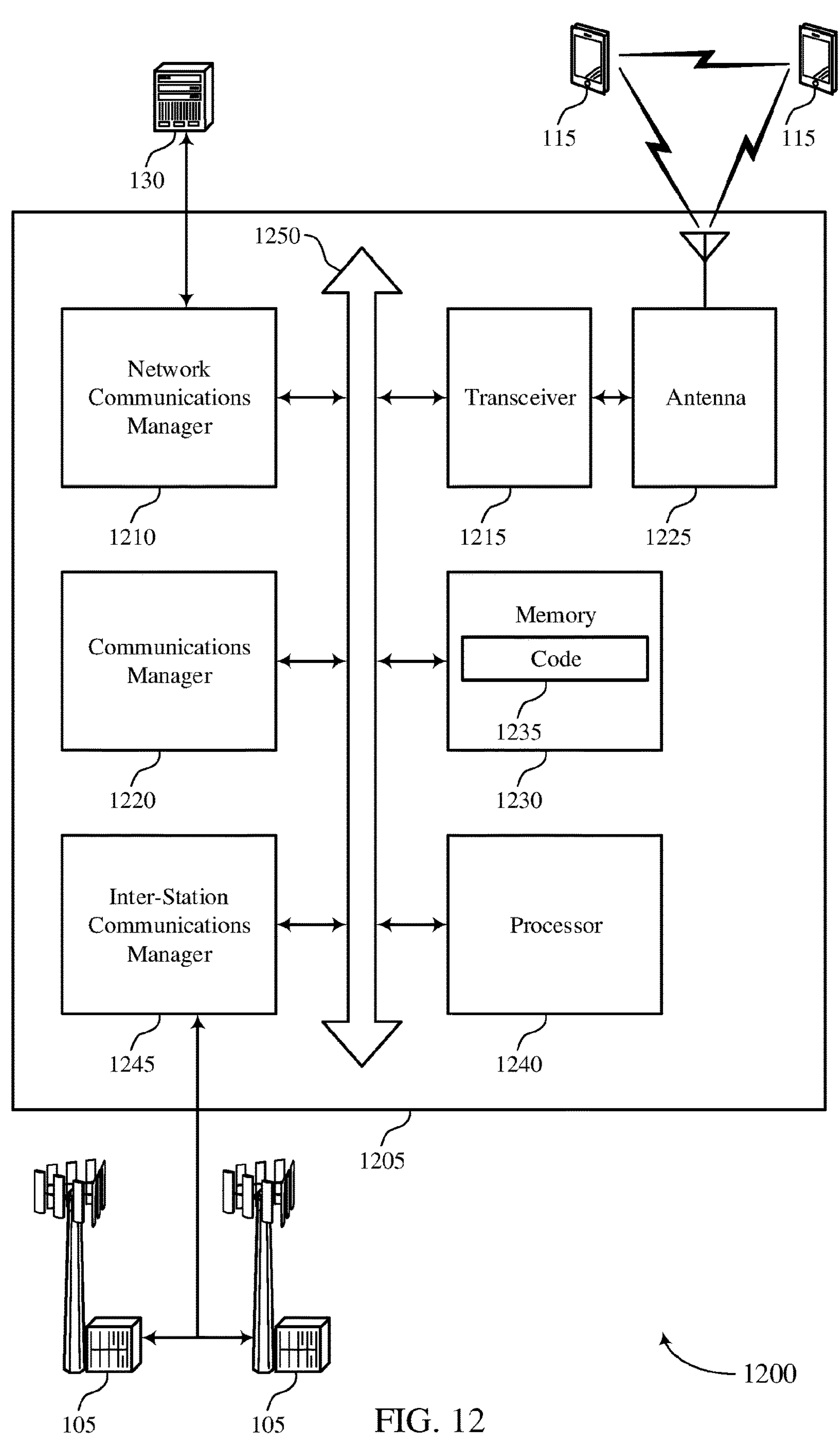
FIG. 12 shows a diagram of a system including a device that supports measurement reporting and handover procedures between relay paths in accordance with aspects of the present disclosure.

FIG. 12 shows a diagram of a system 1200 including a device 1205 that supports measurement reporting and handover procedures between relay paths in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting measurement reporting and handover procedures between relay paths). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for communicating with a first UE via a second UE operating as a UE-to-network relay. The communications manager 1220 may be configured as or otherwise support a means for receiving, from the first UE via the second UE, a measurement report associated with the second UE and at least a third UE corresponding to a candidate UE-to-network relay. The communications manager 1220 may be configured as or otherwise support a means for determining to handover the first UE from using the second UE as the UE-to-network relay to using the third UE as the UE-to-network relay based on the measurement report. The communications manager 1220 may be configured as or otherwise support a means for transmitting a handover command to the first UE via the second UE based on determining to handover the first UE. The communications manager 1220 may be configured as or otherwise support a means for communicating with the first UE via the third UE operating as the UE-to-network relay based on the handover command.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of measurement reporting and handover procedures between relay paths as described herein, or the processor 1240 and the memory 1230 may be otherwise configured to perform or support such operations.

Figure 13:
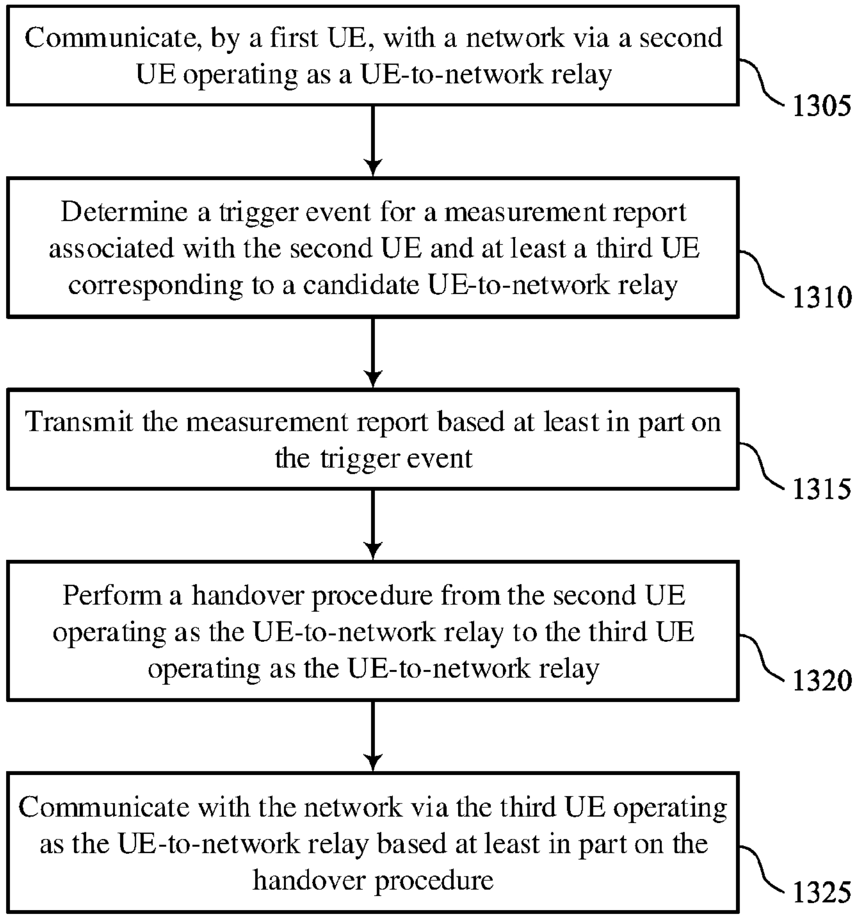
FIGS. 13 through 16 show flowcharts illustrating methods that support measurement reporting and handover procedures between relay paths in accordance with aspects of the present disclosure.

FIG. 13 shows a flowchart illustrating a method 1300 that supports measurement reporting and handover procedures between relay paths in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include communicating with a network via a second UE operating as a UE-to-network relay. The operations of 1305 may be performed in accordance with examples as disclosed herein. In some examples, aspects of the operations of 1305 may be performed by a relay communication component 725 as described with reference to FIG. 7.

At 1310, the method may include determining a trigger event for a measurement report associated with the second UE and at least a third UE corresponding to a candidate UE-to-network relay. The operations of 1310 may be performed in accordance with examples as disclosed herein. In some examples, aspects of the operations of 1310 may be performed by a trigger component 730 as described with reference to FIG. 7.

At 1315, the method may include transmitting the measurement report based on the trigger event. The operations of 1315 may be performed in accordance with examples as disclosed herein. In some examples, aspects of the operations of 1315 may be performed by a measurement reporting component 735 as described with reference to FIG. 7.

At 1320, the method may include performing a handover procedure from the second UE operating as the UE-to-network relay to the third UE operating as the UE-to-network relay. The operations of 1320 may be performed in accordance with examples as disclosed herein. In some examples, aspects of the operations of 1320 may be performed by a handover component 740 as described with reference to FIG. 7.

At 1325, the method may include communicating with the network via the third UE operating as the UE-to-network relay based on the handover procedure. The operations of 1325 may be performed in accordance with examples as disclosed herein. In some examples, aspects of the operations of 1325 may be performed by a relay communication component 725 as described with reference to FIG. 7.

Figure 14:
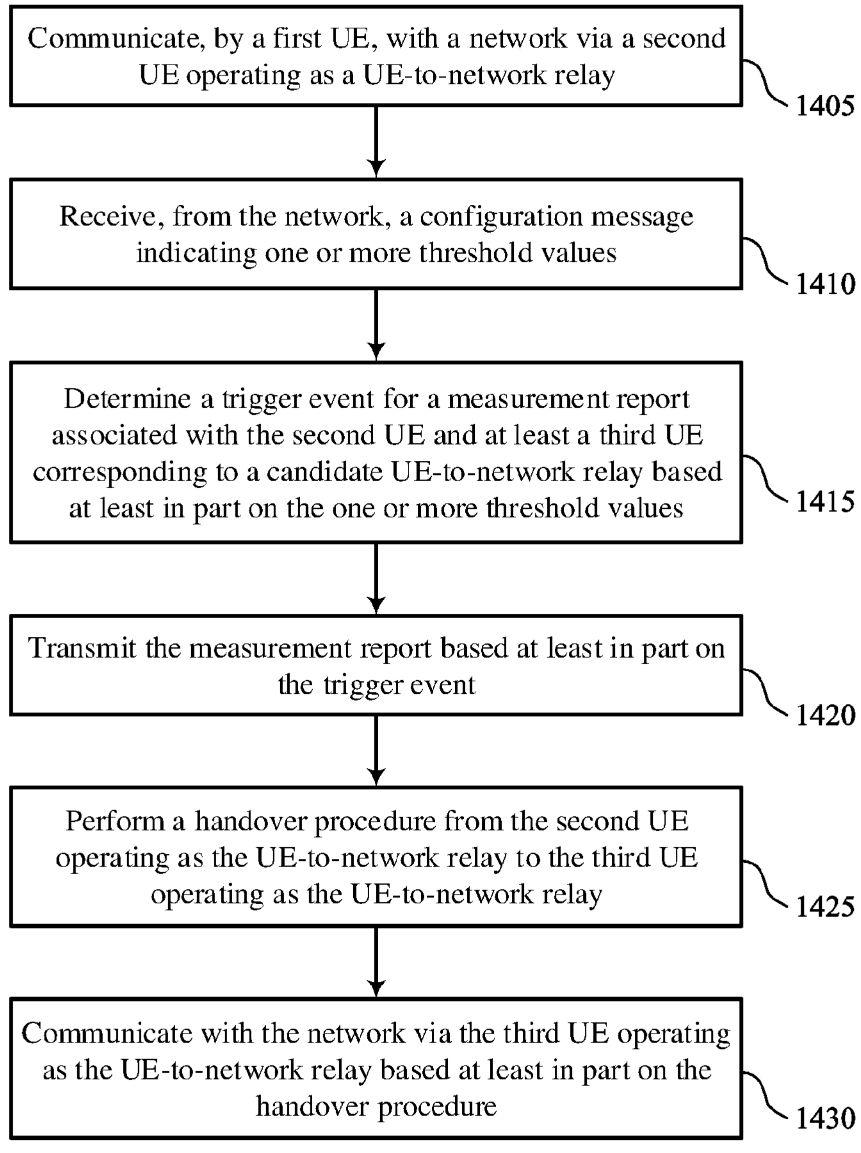

FIG. 14 shows a flowchart illustrating a method 1400 that supports measurement reporting and handover procedures between relay paths in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include communicating with a network via a second UE operating as a UE-to-network relay. The operations of 1405 may be performed in accordance with examples as disclosed herein. In some examples, aspects of the operations of 1405 may be performed by a relay communication component 725 as described with reference to FIG. 7.

At 1410, the method may include receiving, from the network, a configuration message indicating one or more threshold values. The operations of 1410 may be performed in accordance with examples as disclosed herein. In some examples, aspects of the operations of 1410 may be performed by a configuration component 745 as described with reference to FIG. 7.

At 1415, the method may include determining a trigger event for a measurement report associated with the second UE and at least a third UE corresponding to a candidate UE-to-network relay based on the one or more threshold values. The operations of 1415 may be performed in accordance with examples as disclosed herein. In some examples, aspects of the operations of 1415 may be performed by a trigger component 730 as described with reference to FIG. 7.

At 1420, the method may include transmitting the measurement report based on the trigger event. The operations of 1420 may be performed in accordance with examples as disclosed herein. In some examples, aspects of the operations of 1420 may be performed by a measurement reporting component 735 as described with reference to FIG. 7.

At 1425, the method may include performing a handover procedure from the second UE operating as the UE-to-network relay to the third UE operating as the UE-to-network relay. The operations of 1425 may be performed in accordance with examples as disclosed herein. In some examples, aspects of the operations of 1425 may be performed by a handover component 740 as described with reference to FIG. 7.

At 1430, the method may include communicating with the network via the third UE operating as the UE-to-network relay based on the handover procedure. The operations of 1430 may be performed in accordance with examples as disclosed herein. In some examples, aspects of the operations of 1430 may be performed by a relay communication component 725 as described with reference to FIG. 7.

Figure 15:
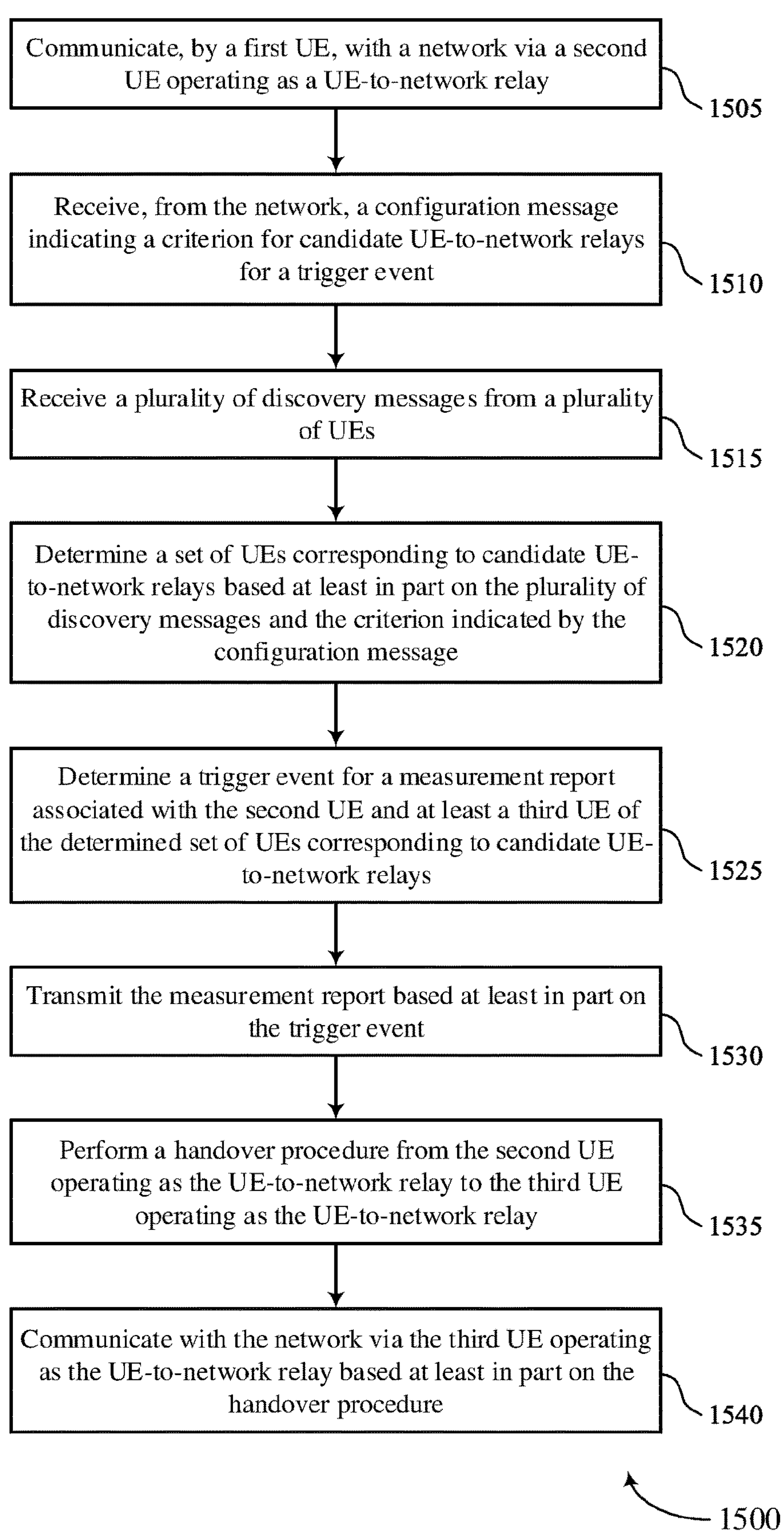

FIG. 15 shows a flowchart illustrating a method 1500 that supports measurement reporting and handover procedures between relay paths in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include communicating with a network via a second UE operating as a UE-to-network relay. The operations of 1505 may be performed in accordance with examples as disclosed herein. In some examples, aspects of the operations of 1505 may be performed by a relay communication component 725 as described with reference to FIG. 7.

At 1510, the method may include receiving, from the network, a configuration message indicating a criterion for candidate UE-to-network relays for a trigger event. The operations of 1510 may be performed in accordance with examples as disclosed herein. In some examples, aspects of the operations of 1510 may be performed by a configuration component 745 as described with reference to FIG. 7.

At 1515, the method may include receiving a set of multiple discovery messages from a set of multiple UEs. The operations of 1515 may be performed in accordance with examples as disclosed herein. In some examples, aspects of the operations of 1515 may be performed by a discovery component 750 as described with reference to FIG. 7.

At 1520, the method may include determining a set of UEs corresponding to candidate UE-to-network relays based on the set of multiple discovery messages and the criterion indicated by the configuration message. The operations of 1520 may be performed in accordance with examples as disclosed herein. In some examples, aspects of the operations of 1520 may be performed by a candidate relay identification component 755 as described with reference to FIG. 7.

At 1525, the method may include determining a trigger event for a measurement report associated with the second UE and at least a third UE corresponding to a candidate UE-to-network relay of the set of UEs. The operations of 1525 may be performed in accordance with examples as disclosed herein. In some examples, aspects of the operations of 1525 may be performed by a trigger component 730 as described with reference to FIG. 7.

At 1530, the method may include transmitting the measurement report based on the trigger event. The operations of 1530 may be performed in accordance with examples as disclosed herein. In some examples, aspects of the operations of 1530 may be performed by a measurement reporting component 735 as described with reference to FIG. 7.

At 1535, the method may include performing a handover procedure from the second UE operating as the UE-to-network relay to the third UE operating as the UE-to-network relay. The operations of 1535 may be performed in accordance with examples as disclosed herein. In some examples, aspects of the operations of 1535 may be performed by a handover component 740 as described with reference to FIG. 7.

At 1540, the method may include communicating with the network via the third UE operating as the UE-to-network relay based on the handover procedure. The operations of 1540 may be performed in accordance with examples as disclosed herein. In some examples, aspects of the operations of 1540 may be performed by a relay communication component 725 as described with reference to FIG. 7.

Figure 16:
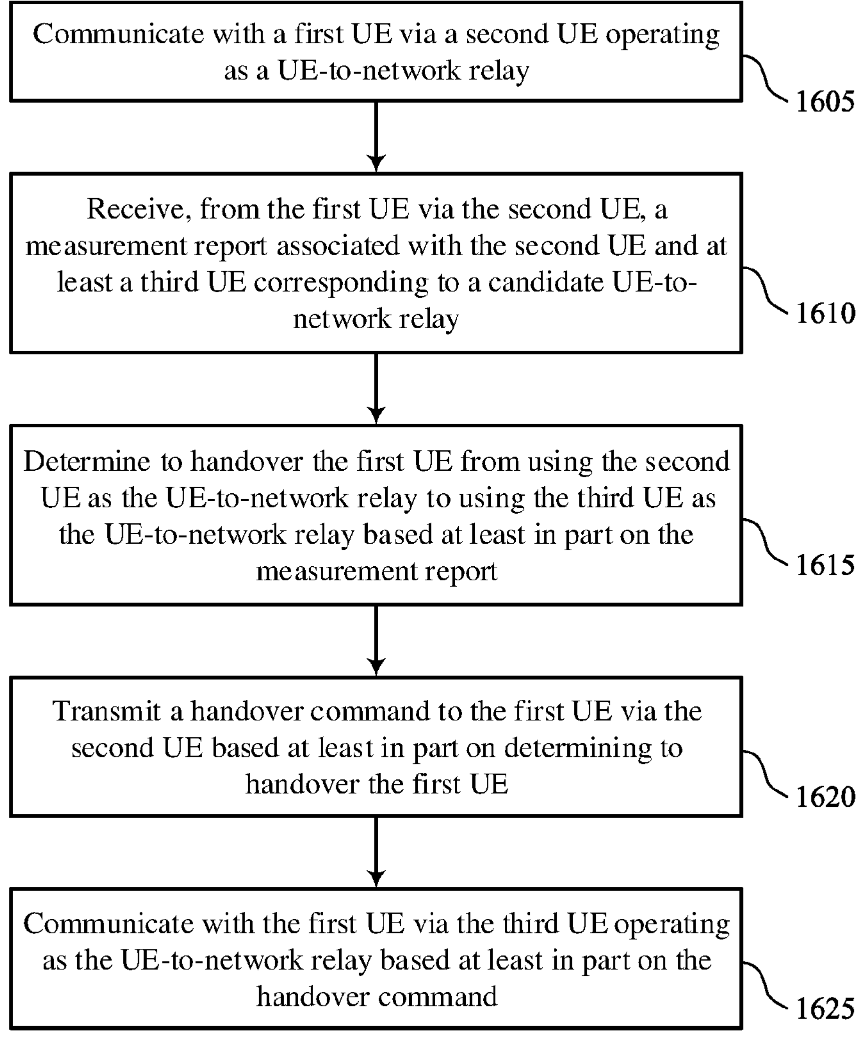

FIG. 16 shows a flowchart illustrating a method 1600 that supports measurement reporting and handover procedures between relay paths in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include communicating with a first UE via a second UE operating as a UE-to-network relay. The operations of 1605 may be performed in accordance with examples as disclosed herein. In some examples, aspects of the operations of 1605 may be performed by a relay communication component 1125 as described with reference to FIG. 11.

At 1610, the method may include receiving, from the first UE via the second UE, a measurement report associated with the second UE and at least a third UE corresponding to a candidate UE-to-network relay. The operations of 1610 may be performed in accordance with examples as disclosed herein. In some examples, aspects of the operations of 1610 may be performed by a measurement report reception component 1130 as described with reference to FIG. 11.

At 1615, the method may include determining to handover the first UE from using the second UE as the UE-to-network relay to using the third UE as the UE-to-network relay based on the measurement report. The operations of 1615 may be performed in accordance with examples as disclosed herein. In some examples, aspects of the operations of 1615 may be performed by a handover determination component 1135 as described with reference to FIG. 11.

At 1620, the method may include transmitting a handover command to the first UE via the second UE based on determining to handover the first UE. The operations of 1620 may be performed in accordance with examples as disclosed herein. In some examples, aspects of the operations of 1620 may be performed by a handover command component 1140 as described with reference to FIG. 11.

At 1625, the method may include communicating with the first UE via the third UE operating as the UE-to-network relay based on the handover command. The operations of 1625 may be performed in accordance with examples as disclosed herein. In some examples, aspects of the operations of 1625 may be performed by a relay communication component 1125 as described with reference to FIG. 11.

The following provides an overview of aspects of the present disclosure:

Aspect 1: A method for wireless communications at a first UE, comprising: communicating with a network via a second UE operating as a UE-to-network relay; determining a trigger event for a measurement report associated with the second UE and at least a third UE corresponding to a candidate UE-to-network relay; transmitting the measurement report based at least in part on the trigger event; performing a handover procedure from the second UE operating as the UE-to-network relay to the third UE operating as the UE-to-network relay; and communicating with the network via the third UE operating as the UE-to-network relay based at least in part on the handover procedure.

Aspect 2: The method of aspect 1, further comprising: receiving, from the network, a configuration message indicating one or more threshold values, wherein the trigger event for the measurement report is determined based at least in part on the one or more threshold values.

Aspect 3: The method of aspect 2, wherein the configuration message comprises a radio resource control message.

Aspect 4: The method of any of aspects 1 through 3, wherein determining the trigger event for the measurement report comprises: determining that a first sidelink channel metric between the first UE and the second UE fails to satisfy a first threshold value; and determining that a second sidelink channel metric between the first UE and the third UE satisfies a second threshold value.

Aspect 5: The method of any of aspects 1 through 3, wherein determining the trigger event for the measurement report comprises: determining that a difference between a first sidelink channel metric between the first UE and the second UE and a second sidelink channel metric between the first UE and the third UE satisfies a threshold offset value.

Aspect 6: The method of any of aspects 1 through 3, wherein determining the trigger event for the measurement report comprises: determining that a first channel metric between the first UE and the second UE fails to satisfy a first threshold value; and determining that a second channel metric between the first UE and a base station satisfies a second threshold value.

Aspect 7: The method of any of aspects 1 through 6, further comprising: receiving a plurality of discovery messages from a plurality of UEs; and determining a set of UEs corresponding to candidate UE-to-network relays based at least in part on the plurality of discovery messages, the set of UEs comprising at least the third UE.

Aspect 8: The method of aspect 7, further comprising: receiving, from the network, a configuration message indicating a criterion for the candidate UE-to-network relays for the trigger event, wherein determining the set of UEs corresponding to the candidate UE-to-network relays is based at least in part on the configuration message.

Aspect 9: The method of aspect 8, wherein the criterion indicates that each candidate UE-to-network relay of the candidate UE-to-network relays corresponds to a same serving base station as the first UE, each candidate UE-to-network relay of the candidate UE-to-network relays corresponds to a same public land mobile network identifier as the first UE, or both.

Aspect 10: The method of any of aspects 8 through 9, wherein the configuration message comprises a radio resource control message.

Aspect 11: The method of any of aspects 1 through 10, wherein the measurement report comprises a first sidelink channel metric corresponding to the second UE, a second sidelink channel metric corresponding to the third UE, a first relay identifier for the second UE, a second relay identifier for the third UE, first load information for the second UE, second load information for the third UE, first power information for the second UE, second power information for the third UE, a first radio resource control state for the second UE, a second radio resource control state for the third UE, a first serving cell identifier for the second UE, a second serving cell identifier for the third UE, a first public land mobile network identifier associated with the second UE, a second public land mobile network identifier associated with the third UE, a channel metric corresponding to a base station, a cell identifier for the base station, or a combination thereof.

Aspect 12: The method of any of aspects 1 through 11, wherein performing the handover procedure comprises: receiving, from the network via the second UE, a handover command indicating a PC5 radio link control channel configuration for the third UE; and reconfiguring an existing PC5 connection with the third UE based at least in part on the PC5 radio link control channel configuration, wherein the third UE operates as the UE-to-network relay for the first UE based at least in part on the reconfiguring.

Aspect 13: The method of any of aspects 1 through 11, wherein performing the handover procedure comprises: receiving, from the network via the second UE, a handover command indicating a PC5 radio link control channel configuration for the third UE; and establishing a PC5 connection with the third UE based at least in part on the PC5 radio link control channel configuration, wherein the third UE operates as the UE-to-network relay for the first UE based at least in part on the establishing.

Aspect 14: The method of any of aspects 1 through 13, wherein performing the handover procedure comprises: transmitting, to the second UE, a message indicating a PC5 radio link control channel reconfiguration for the second UE; and reconfiguring an existing PC5 connection with the second UE based at least in part on the PC5 radio link control channel reconfiguration, wherein the second UE stops operating as the UE-to-network relay for the first UE based at least in part on the reconfiguring.

Aspect 15: The method of any of aspects 1 through 13, wherein performing the handover procedure comprises: transmitting, to the second UE, a message indicating a PC5 radio link control channel release for the second UE; and releasing an existing PC5 connection with the second UE based at least in part on the PC5 radio link control channel release, wherein the second UE stops operating as the UE-to-network relay for the first UE based at least in part on the releasing.

Aspect 16: The method of any of aspects 1 through 15, wherein the UE-to-network relay comprises an L2 UE-to-network relay supporting a PC5-to-Uu bearer mapping.

Aspect 17: The method of any of aspects 1 through 16, wherein the second UE relays first messages between the first UE and a first base station associated with a first public land mobile network identifier; and the third UE relays second messages between the first UE and the first base station, the first UE and a second base station associated with the first public land mobile network identifier, or the first UE and a third base station associated with a second public land mobile network identifier.

Aspect 18: The method of any of aspects 1 through 17, wherein communicating with the network via the second UE operating as the UE-to-network relay comprises: transmitting a first uplink message to the second UE via a first PC5 interface; and receiving a first downlink message from the second UE via the first PC5 interface; and communicating with the network via the third UE operating as the UE-to-network relay comprises: transmitting a second uplink message to the third UE via a second PC5 interface; and receiving a second downlink message from the third UE via the second PC5 interface.

Aspect 19: A method for wireless communications at a base station, comprising: communicating with a first UE via a second UE operating as a UE-to-network relay; receiving, from the first UE via the second UE, a measurement report associated with the second UE and at least a third UE corresponding to a candidate UE-to-network relay; determining to handover the first UE from using the second UE as the UE-to-network relay to using the third UE as the UE-to-network relay based at least in part on the measurement report; transmitting a handover command to the first UE via the second UE based at least in part on determining to handover the first UE; and communicating with the first UE via the third UE operating as the UE-to-network relay based at least in part on the handover command.

Aspect 20: The method of aspect 19, further comprising: transmitting, to the first UE, a configuration message indicating one or more threshold values, wherein the measurement report is received based at least in part on a trigger event at the first UE triggering transmission of the measurement report based at least in part on the one or more threshold values.

Aspect 21: The method of aspect 20, wherein the configuration message comprises a radio resource control message.

Aspect 22: The method of any of aspects 19 through 21, further comprising: transmitting, to the first UE, a configuration message indicating a criterion for a set of candidate UE-to-network relays for the first UE, wherein the measurement report comprises information for the set of candidate UE-to-network relays based at least in part on the criterion.

Aspect 23: The method of aspect 22, wherein the criterion indicates that each candidate UE-to-network relay of the set of candidate UE-to-network relays corresponds to the base station serving the first UE, each candidate UE-to-network relay of the set of candidate UE-to-network relays corresponds to a same public land mobile network identifier as the first UE, or both.

Aspect 24: The method of any of aspects 22 through 23, wherein the configuration message comprises a radio resource control message.

Aspect 25: The method of any of aspects 19 through 24, wherein the measurement report comprises a first sidelink channel metric corresponding to the second UE, a second sidelink channel metric corresponding to the third UE, a first relay identifier for the second UE, a second relay identifier for the third UE, first load information for the second UE, second load information for the third UE, first power information for the second UE, second power information for the third UE, a first radio resource control state for the second UE, a second radio resource control state for the third UE, a first serving cell identifier for the second UE, a second serving cell identifier for the third UE, a first public land mobile network identifier associated with the second UE, a second public land mobile network identifier associated with the third UE, a channel metric corresponding to a second base station, a cell identifier for the second base station, or a combination thereof.

Aspect 26: The method of any of aspects 19 through 25, further comprising: transmitting, to the third UE, a radio resource control reconfiguration message indicating a PC5-to-Uu bearer mapping, wherein the third UE operates as the UE-to-network relay for the first UE based at least in part on the PC5-to-Uu bearer mapping.

Aspect 27: The method of any of aspects 19 through 26, further comprising: transmitting, to the second UE, a radio resource control reconfiguration message comprising an indication to release a PC5-to-Uu bearer mapping, wherein the second UE stops operating as the UE-to-network relay for the first UE based at least in part on the indication to release the PC5-to-Uu bearer mapping.

Aspect 28: The method of any of aspects 19 through 27, wherein the handover command indicates a PC5 radio link control channel configuration for the first UE and the third UE, the third UE operates as the UE-to-network relay for the first UE based at least in part on the PC5 radio link control channel configuration.

Aspect 29: The method of any of aspects 19 through 28, wherein the UE-to-network relay comprises an L2 UE-to-network relay supporting a PC5-to-Uu bearer mapping.

Aspect 30: The method of any of aspects 19 through 29, wherein communicating with the first UE via the second UE operating as the UE-to-network relay comprises: receiving a first uplink message from the second UE via a first Uu interface; and transmitting a first downlink message to the second UE via the first Uu interface; and communicating with the first UE via the third UE operating as the UE-to-network relay comprises: receiving a second uplink message from the third UE via a second Uu interface; and transmitting a second downlink message to the third UE via the second Uu interface.

Aspect 31: An apparatus for wireless communications at a first UE, comprising a processor; memory coupled with the processor; and instructions stored in the memory and executable by the processor to cause the apparatus to perform a method of any of aspects 1 through 18.

Aspect 32: An apparatus for wireless communications at a first UE, comprising at least one means for performing a method of any of aspects 1 through 18.

Aspect 33: A non-transitory computer-readable medium storing code for wireless communications at a first UE, the code comprising instructions executable by a processor to perform a method of any of aspects 1 through 18.

Aspect 34: An apparatus for wireless communications at a base station, comprising a processor; memory coupled with the processor; and instructions stored in the memory and executable by the processor to cause the apparatus to perform a method of any of aspects 19 through 30.

Aspect 35: An apparatus for wireless communications at a base station, comprising at least one means for performing a method of any of aspects 19 through 30.

Aspect 36: A non-transitory computer-readable medium storing code for wireless communications at a base station, the code comprising instructions executable by a processor to perform a method of any of aspects 19 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:

communicating with a network via a second UE operating as a UE-to-network relay;

determining a trigger event for a measurement report associated with the second UE and at least a third UE corresponding to a candidate UE-to-network relay;

transmitting the measurement report based at least in part on the trigger event;

receiving, from the network via the second UE, a handover command indicating a PC5 radio link control channel configuration for the third UE;

performing a handover procedure from the second UE operating as the UE-to-network relay to the third UE operating as the UE-to-network relay in accordance with the handover command; and communicating with the network via the third UE operating as the UE-to-network relay based at least in part on the handover procedure.

2. The method of claim 1, further comprising:

receiving, from the network, a configuration message indicating one or more threshold values, wherein the trigger event for the measurement report is determined based at least in part on the one or more threshold values.

3. The method of claim 2, wherein the configuration message comprises a radio resource control message.

4. The method of claim 1, wherein determining the trigger event for the measurement report comprises:

determining that a first sidelink channel metric between the first UE and the second UE fails to satisfy a first threshold value; and determining that a second sidelink channel metric between the first UE and the third UE satisfies a second threshold value.

5. The method of claim 1, wherein determining the trigger event for the measurement report comprises:

determining that a difference between a first sidelink channel metric between the first UE and the second UE and a second sidelink channel metric between the first UE and the third UE satisfies a threshold offset value.

6. The method of claim 1, wherein determining the trigger event for the measurement report comprises:

determining that a first channel metric between the first UE and the second UE fails to satisfy a first threshold value; and determining that a second channel metric between the first UE and a base station satisfies a second threshold value.

7. The method of claim 1, further comprising:

receiving a plurality of discovery messages from a plurality of UEs; and determining a set of UEs corresponding to candidate UE-to-network relays based at least in part on the plurality of discovery messages, the set of UEs comprising at least the third UE.

8. The method of claim 7, further comprising:

receiving, from the network, a configuration message indicating a criterion for the candidate UE-to-network relays for the trigger event, wherein determining the set of UEs corresponding to the candidate UE-to-network relays is based at least in part on the configuration message.

9. The method of claim 8, wherein the criterion indicates that each candidate UE-to-network relay of the candidate UE-to-network relays corresponds to a same serving base station as the first UE, each candidate UE-to-network relay of the candidate UE-to-network relays corresponds to a same public land mobile network identifier as the first UE, or both.

10. The method of claim 8, wherein the configuration message comprises a radio resource control message.

11. The method of claim 1, wherein the measurement report comprises a first sidelink channel metric corresponding to the second UE, a second sidelink channel metric corresponding to the third UE, a first relay identifier for the second UE, a second relay identifier for the third UE, first load information for the second UE, second load information for the third UE, first power information for the second UE, second power information for the third UE, a first radio resource control state for the second UE, a second radio resource control state for the third UE, a first serving cell identifier for the second UE, a second serving cell identifier for the third UE, a first public land mobile network identifier associated with the second UE, a second public land mobile network identifier associated with the third UE, a channel metric corresponding to a base station, a cell identifier for the base station, or a combination thereof.

12. The method of claim 1, wherein performing the handover procedure comprises:

reconfiguring an existing PC5 connection with the third UE based at least in part on the PC5 radio link control channel configuration, wherein the third UE operates as the UE-to-network relay for the first UE based at least in part on the reconfiguring.

13. The method of claim 1, wherein performing the handover procedure comprises:

establishing a PC5 connection with the third UE based at least in part on the PC5 radio link control channel configuration, wherein the third UE operates as the UE-to-network relay for the first UE based at least in part on the establishing.

14. The method of claim 1, wherein performing the handover procedure comprises:

transmitting, to the second UE, a message indicating a PC5 radio link control channel reconfiguration for the second UE; and reconfiguring an existing PC5 connection with the second UE based at least in part on the PC5 radio link control channel reconfiguration, wherein the second UE stops operating as the UE-to-network relay for the first UE based at least in part on the reconfiguring.

15. The method of claim 1, wherein performing the handover procedure comprises:

transmitting, to the second UE, a message indicating a PC5 radio link control channel release for the second UE; and releasing an existing PC5 connection with the second UE based at least in part on the PC5 radio link control channel release, wherein the second UE stops operating as the UE-to-network relay for the first UE based at least in part on the releasing.

16. The method of claim 1, wherein the UE-to-network relay comprises a layer 2 (L2) UE-to-network relay supporting a PC5-to-Uu bearer mapping.

17. The method of claim 1, wherein:

the second UE relays first messages between the first UE and a first base station associated with a first public land mobile network identifier; and the third UE relays second messages between the first UE and the first base station, the first UE and a second base station associated with the first public land mobile network identifier, or the first UE and a third base station associated with a second public land mobile network identifier.

18. The method of claim 1, wherein:

communicating with the network via the second UE operating as the UE-to-network relay comprises:

transmitting a first uplink message to the second UE via a first PC5 interface; and receiving a first downlink message from the second UE via the first PC5 interface; and communicating with the network via the third UE operating as the UE-to-network relay comprises:

transmitting a second uplink message to the third UE via a second PC5 interface; and receiving a second downlink message from the third UE via the second PC5 interface.

19. A method for wireless communications at a base station, comprising:

communicating with a first user equipment (UE) via a second UE operating as a UE-to-network relay;

receiving, from the first UE via the second UE, a measurement report associated with the second UE and at least a third UE corresponding to a candidate UE-to-network relay;

determining to handover the first UE from using the second UE as the UE-to-network relay to using the third UE as the UE-to-network relay based at least in part on the measurement report;

transmitting a handover command to the first UE via the second UE indicating a PC5 radio link control channel configuration for the third UE based at least in part on determining to handover the first UE; and communicating with the first UE via the third UE operating as the UE-to-network relay based at least in part on the handover command.

20. The method of claim 19, further comprising:

transmitting, to the first UE, a configuration message indicating one or more threshold values, wherein the measurement report is received based at least in part on a trigger event at the first UE triggering transmission of the measurement report based at least in part on the one or more threshold values.

21. The method of claim 20, wherein the configuration message comprises a radio resource control message.

22. The method of claim 19, further comprising:

transmitting, to the first UE, a configuration message indicating a criterion for a set of candidate UE-to-network relays for the first UE, wherein the measurement report comprises information for the set of candidate UE-to-network relays based at least in part on the criterion.

23. The method of claim 22, wherein the criterion indicates that each candidate UE-to-network relay of the set of candidate UE-to-network relays corresponds to the base station serving the first UE, each candidate UE-to-network relay of the set of candidate UE-to-network relays corresponds to a same public land mobile network identifier as the first UE, or both.

24. The method of claim 22, wherein the configuration message comprises a radio resource control message.

25. The method of claim 19, wherein the measurement report comprises a first sidelink channel metric corresponding to the second UE, a second sidelink channel metric corresponding to the third UE, a first relay identifier for the second UE, a second relay identifier for the third UE, first load information for the second UE, second load information for the third UE, first power information for the second UE, second power information for the third UE, a first radio resource control state for the second UE, a second radio resource control state for the third UE, a first serving cell identifier for the second UE, a second serving cell identifier for the third UE, a first public land mobile network identifier associated with the second UE, a second public land mobile network identifier associated with the third UE, a channel metric corresponding to a second base station, a cell identifier for the second base station, or a combination thereof.

26. The method of claim 19, further comprising:

transmitting, to the third UE, a radio resource control reconfiguration message indicating a PC5-to-Uu bearer mapping, wherein the third UE operates as the UE-to-network relay for the first UE based at least in part on the PC5-to-Uu bearer mapping.

27. The method of claim 19, further comprising:

transmitting, to the second UE, a radio resource control reconfiguration message comprising an indication to release a PC5-to-Uu bearer mapping, wherein the second UE stops operating as the UE-to-network relay for the first UE based at least in part on the indication to release the PC5-to-Uu bearer mapping.

28. The method of claim 19, wherein the UE-to-network relay comprises a layer 2 (L2) UE-to-network relay supporting a PC5-to-Uu bearer mapping.

29. An apparatus for wireless communications at a first user equipment (UE), comprising:

one or more processors;

one or more memories coupled with the one or more processors; and instructions stored in the one or more memories and executable by the one or more processors to cause the apparatus to:

communicate with a network via a second UE operating as a UE-to-network relay;

determine a trigger event for a measurement report associated with the second UE and at least a third UE corresponding to a candidate UE-to-network relay;

transmit the measurement report based at least in part on the trigger event;

receiving, from the network via the second UE, a handover command indicating a PC5 radio link control channel configuration for the third UE;

perform a handover procedure from the second UE operating as the UE-to-network relay to the third UE operating as the UE-to-network relay in accordance with the handover command; and communicate with the network via the third UE operating as the UE-to-network relay based at least in part on the handover procedure.

30. An apparatus for wireless communications at a base station, comprising:

one or more processors;

one or more memories coupled with the one or more processors; and instructions stored in the one or more memories and executable by the one or more processors to cause the apparatus to:

communicate with a first user equipment (UE) via a second UE operating as a UE-to-network relay;

receive, from the first UE via the second UE, a measurement report associated with the second UE and at least a third UE corresponding to a candidate UE-to-network relay;

determine to handover the first UE from using the second UE as the UE-to-network relay to using the third UE as the UE-to-network relay based at least in part on the measurement report;

transmit a handover command to the first UE via the second UE indicating a PC5 radio link control channel configuration for the third UE based at least in part on determining to handover the first UE; and communicate with the first UE via the third UE operating as the UE-to-network relay based at least in part on the handover command.

* * * * *